United States Patent
Yuyama et al.

(10) Patent No.: US 9,242,785 B2
(45) Date of Patent: Jan. 26, 2016

(54) MEDICINE CASSETTE AND MEDICINE FEEDING APPARATUS

(75) Inventors: Hiroyuki Yuyama, Toyonaka (JP); Naoki Koike, Toyonaka (JP); Mitsuhiro Mitani, Toyonaka (JP); Masao Fukada, Toyonaka (JP)

(73) Assignee: YUYAMA MFG. CO., LTD., Toyonaka-shi (JP)

( * ) Notice: Subject to any disclaimer, the term of this patent is extended or adjusted under 35 U.S.C. 154(b) by 27 days.

(21) Appl. No.: 14/343,307

(22) PCT Filed: Sep. 4, 2012

(86) PCT No.: PCT/JP2012/072457
§ 371 (c)(1),
(2), (4) Date: Mar. 6, 2014

(87) PCT Pub. No.: WO2013/035692
PCT Pub. Date: Mar. 14, 2013

(65) Prior Publication Data
US 2014/0246451 A1    Sep. 4, 2014

(30) Foreign Application Priority Data
Sep. 6, 2011   (JP) .................. 2011-194276

(51) Int. Cl.
| | |
|---|---|
| G07F 11/32 | (2006.01) |
| B65D 83/00 | (2006.01) |
| B65B 35/06 | (2006.01) |
| B65B 35/26 | (2006.01) |
| B65G 47/14 | (2006.01) |
| G07F 17/00 | (2006.01) |
| A61J 7/00 | (2006.01) |

(52) U.S. Cl.
CPC ........... *B65D 83/0083* (2013.01); *A61J 7/0076* (2013.01); *B65B 35/06* (2013.01); *B65B 35/26* (2013.01); *B65G 47/14* (2013.01); *B65G47/1457* (2013.01); *G07F 11/32* (2013.01); *G07F 17/0092* (2013.01)

(58) Field of Classification Search
CPC ........ G07F 17/0092; G07F 11/44; A61J 7/02; B65G 47/14; B65D 83/04
See application file for complete search history.

(56) References Cited

U.S. PATENT DOCUMENTS

| | | | | |
|---|---|---|---|---|
| 6,471,093 | B1 * | 10/2002 | Kodama ........................ | 221/277 |
| 8,827,112 | B2 * | 9/2014 | Yuyama et al. ................ | 221/237 |
| 8,839,988 | B2 * | 9/2014 | Yuyama et al. ................ | 221/277 |

FOREIGN PATENT DOCUMENTS

| | | |
|---|---|---|
| DE | 3310535 A1 | 10/1984 |
| JP | S61 12509 A | 1/1986 |

(Continued)

OTHER PUBLICATIONS

European Patent Office, Extended European Search Report mailed Jul. 2, 2015 in European Application No. 12830308.8 (International Patent Application No. PCT/JP2012/072457), 6 pages.

*Primary Examiner* — Timothy Waggoner
(74) *Attorney, Agent, or Firm* — Masuvalley & Partners

(57) ABSTRACT

A medicine feeding apparatus includes a cylindrical body 8, a first rotating body 9, and a second rotating body 10. The first rotating body 9 is disposed on the inner side of the cylindrical body 8, and together with the cylindrical body 8, constitutes a medicine storage section 42 capable of storing medicine. The first rotating body 9 can reciprocate in the axial direction of the cylindrical body 8, and can rotate about a first rotary axis. The second rotating body 10 is disposed on the outer circumference of an opening of the cylindrical body 8, and can rotate about a second rotary axis. This configuration has a function of smoothly performing automatic dispensing depending on the remaining amount of stored medicine while storing a large amount of medicine.

12 Claims, 27 Drawing Sheets

(56) References Cited

FOREIGN PATENT DOCUMENTS

| JP | H01-51403 B2 | 11/1989 |
| JP | 2000-203525 A | 7/2000 |
| JP | 2002-338033 A | 11/2002 |
| WO | 8905273 A1 | 6/1989 |
| WO | WO2012/099189 A1 | 7/2012 |

* cited by examiner

MEDICINE CASSETTE AND MEDICINE FEEDING APPARATUS

TECHNICAL FIELD

The present invention relates to a medicine cassette and a medicine feeding apparatus.

BACKGROUND ART

Conventionally, an apparatus for aligning and feeding small articles (goods), which includes a disc-like first rotating body rotated by a first driving means and an annular second rotating body rotated by a second driving means, is publicly known (refer to Japanese Examined Patent Publication No. 1989-51403, for example).

However, in the conventional apparatus, positional relationship between the first rotating body and the second rotating body is fixed to and limit the number of storable goods is limited. In the case where an article to be stored is medicine, it is desirable to maximize the amount of stored medicine so as not to frequently perform a refilling operation and however, there is a limit to feed medicines by means of the first rotating body and the second rotating body.

SUMMARY OF THE INVENTION

Problems to be Solved by the Invention

An object of the present invention is to provide a medicine cassette capable of smoothly performing automatic dispensing of medicine depending on the remaining amount of stored medicine while storing a large amount of medicine.

Means for Solving the Problems

In order to solve the above problems, the present invention provides a medicine cassette including:
a cylindrical body;
a first rotating body disposed on the inner side of the cylindrical body, the first rotating body together with the cylindrical body constituting a medicine storage section capable of storing medicine, the first rotating body being reciprocable in the axial direction of the cylindrical body and being rotatable about a first rotary axis; and
a second rotating body disposed on the outer circumference of an opening of the cylindrical body, the second rotating body being rotatable about a second rotary axis.

With this configuration, when medicine is refilled, the first rotating body can be moved toward one end of the cylindrical body to extend the medicine storage section. When medicine is dispensed from the medicine storage section, the first rotating body can be gradually moved toward the other end to smoothly transfer medicine to the second rotating body.

Preferably, the first rotating body is disposed such that its upper surface is inclined with respect to the axis of the cylindrical body.

With this configuration, medicine in the medicine storage section can be moved from part of the circumference of the first rotating body to the second rotating body. Therefore, medicine can be smoothly moved onto the second rotating body while controlling the amount of medicine.

The medicine cassette may include a discharge section for discharging medicine moving to the outer circumference with rotation of the second rotating body.

Preferably, the cylindrical body can rotate in the circumferential direction, and includes a guide section on its inner circumferential surface,
the first rotating body includes a guide receiving section for guiding the guide section, and
the guide receiving section guides the guide section such that the first rotating body cannot rotate in the circumferential direction with respect to the cylindrical body and can reciprocate in the axial direction.

With this configuration, that is, with the configuration in which the guide receiving section guides the guide section, the movement of the first rotating body in the axial direction can be stabilized. By rotating the cylindrical section, the first rotating body can be rotated.

The first rotating body may be provided with a second shaft member capable of transmitting a rotational driving force.

Preferably, the medicine cassette further includes a link mechanism for allowing the first rotating body to reciprocate in the axial direction of the cylindrical body.

The link mechanism may include a first link coupled to the first rotating body so as to be rotatable about a spindle, a second link rotatably coupled to the first link, and a cylindrical cam member having an inclined section rotated to change its contact position with the second link in the axial direction.

With this configuration, merely by rotating the cylindrical cam member, the link mechanism can be driven via the second link to reciprocate the first rotating body in the axial direction of the cylindrical body.

The link mechanism may be configured of two pairs of links, the links in each pair being spaced with a predetermined interval, and in each link pair, intermediate sections of the links may be rotatably coupled to each other, and one ends of the links may be slidably coupled to the first rotating body to be extendable.

With this configuration, the reciprocation of the first rotating body in the axial direction can be further stabilized.

The medicine cassette may further include a first shaft member having a helical groove formed in the outer circumferential surface in the axial direction; and
a bearing member having a guide pin movably disposed in the helical groove, the bearing member supporting the first rotating body.

With this configuration, merely by positively and negatively rotating the first shaft member, the first rotating body can be reciprocated in the axial direction.

Preferably, the first rotating body includes an inner circumferential gear, and
the second shaft member has a vertical gear engaging with the inner circumferential gear in the outer circumferential surface.

With this configuration, merely by rotating the second shaft member, the first rotating body can be rotated.

Preferably, the first rotating body is movable in the cylindrical body in one axial direction by own weight.

With this configuration, the first rotating body can be moved without requiring any special driving source.

Preferably, the medicine cassette further includes:
a grasping section formed on a front surface;
a transmitting section for transmitting a rotational driving force to rotate the cylindrical body to the cylindrical body;
a transmitting section for transmitting a rotational driving force to rotate the first rotating body to the first rotating body; and
a transmitting section for transmitting a rotational driving force to rotate the second rotating body to the second rotating body, wherein the three transmitting sections are exposed from a back surface.

With this configuration, merely by grasping the grasping section and attaching the grasping section to an object to be attached, power can be transmitted via each of the transmitting sections.

Preferably, the medicine cassette includes a width limiting section for limiting a width that can pass medicine conveyed on the second rotating body, wherein
the cylindrical body has an expanding area gradually protruding downward to the inner diameter side from the inner circumference of the second rotating body in an area, the width of which is limited by the width limiting section.

With this configuration, medicine that is limited by the width limiting section and falls inward from the second rotating body can be smoothly returned to the first rotating body, preventing damage of medicine.

Moreover, in order to solve the above problems, the present invention provides a medicine feeding apparatus including:
the medicine cassette according to any of the above configurations; and
a cassette attachment section to which the medicine cassette can be attached, wherein
the cassette attachment section has driving members for driving the cylindrical body, the first rotating body, and the second rotating body, and
positions where driving forces are transmitted by the driving members are located on the same surface of the cassette attachment section.

With this configuration, the structure can be simplified to facilitate maintenance.

Moreover, in order to solve the above problems, the present invention provides a medicine feeding apparatus including:
the medicine cassette according to any of the above configurations;
a sensor for detecting medicine dispensed from the medicine cassette; and
a controller for determining whether or not a dispensing state deteriorates on the basis of a detection signal from the sensor, and for moving the first rotating body toward the second rotating body in the axial direction of the cylindrical body when it is determined that the dispensing state deteriorates.

Moreover, in order to solve the above problems, the present invention may provide a medicine feeding apparatus including:
a sensor for detecting whether or not medicine is present on the second rotating body; and
a controller for moving the first rotating body toward the second rotating body in the axial direction of the cylindrical body when the sensor detects that no medicine is present on the second rotating body.

With such configuration, the first rotating body can be automatically moved depending on the remaining amount of stored medicine, thereby feeding medicine onto the second rotating body.

Effect of the Invention

According to the present invention, since the first rotating body can reciprocate and rotate in the cylindrical body, the first rotating body can be moved toward one end of the cylindrical body to extend the volume of the medicine storage section, enabling refilling of a large amount of medicine. By gradually moving the first rotating body toward the other end of the cylindrical body, medicine can be dispensed smoothly and automatically depending on the remaining amount of medicine.

MODE FOR CARRYING OUT THE INVENTION

Embodiments of the present invention will be described with reference to appended figures. In following description, terms representing specific directions and locations (for example, terms including "upper", "lower", "side", and "end") are used as needed. However, these terms serves to help understanding of the invention with reference to the figures, and do not limit the technical scope of the present invention. The following description is basically an example, and does not intend to limit the present invention, and applications and usages of the present invention.

First Embodiment

Figure 1:
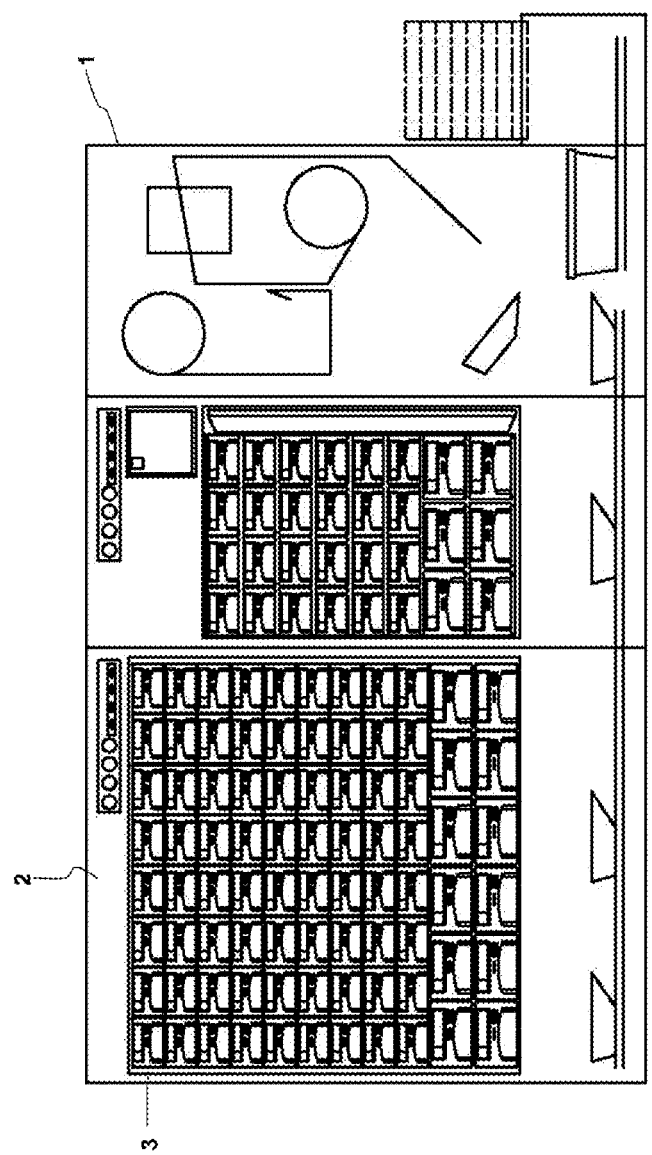
FIG. 1 is a schematic view showing an example of a medicine feeding apparatus according to a first embodiment.
Figure 2:
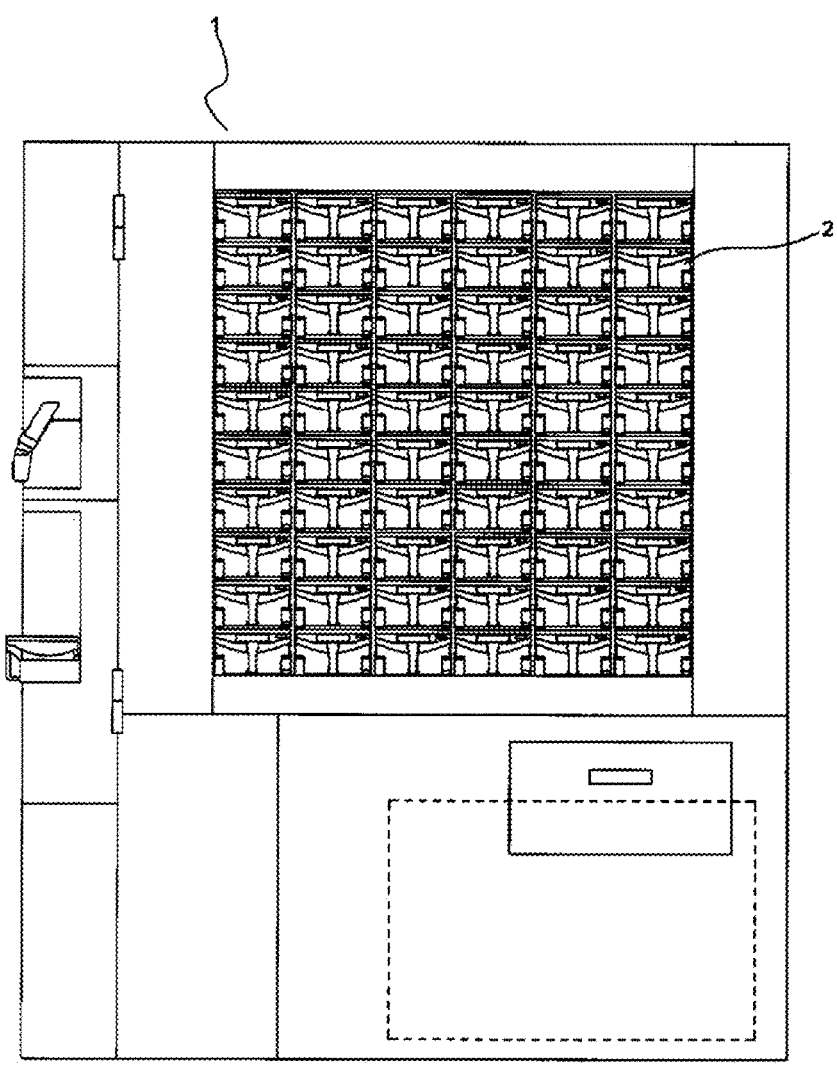
FIG. 2 is a schematic view showing another example of the medicine feeding apparatus according to the first embodiment.

FIG. 1 and FIG. 2 show two examples of a medicine feeding apparatus according to a first embodiment. In the medicine feeding apparatus, a plurality of medicine feeders 3 are provided in a shelf 2 of an apparatus body 1, and each driven component of the medicine feeders 3 is controlled by a controller 4 (refer to FIG. 13).

Figure 3:
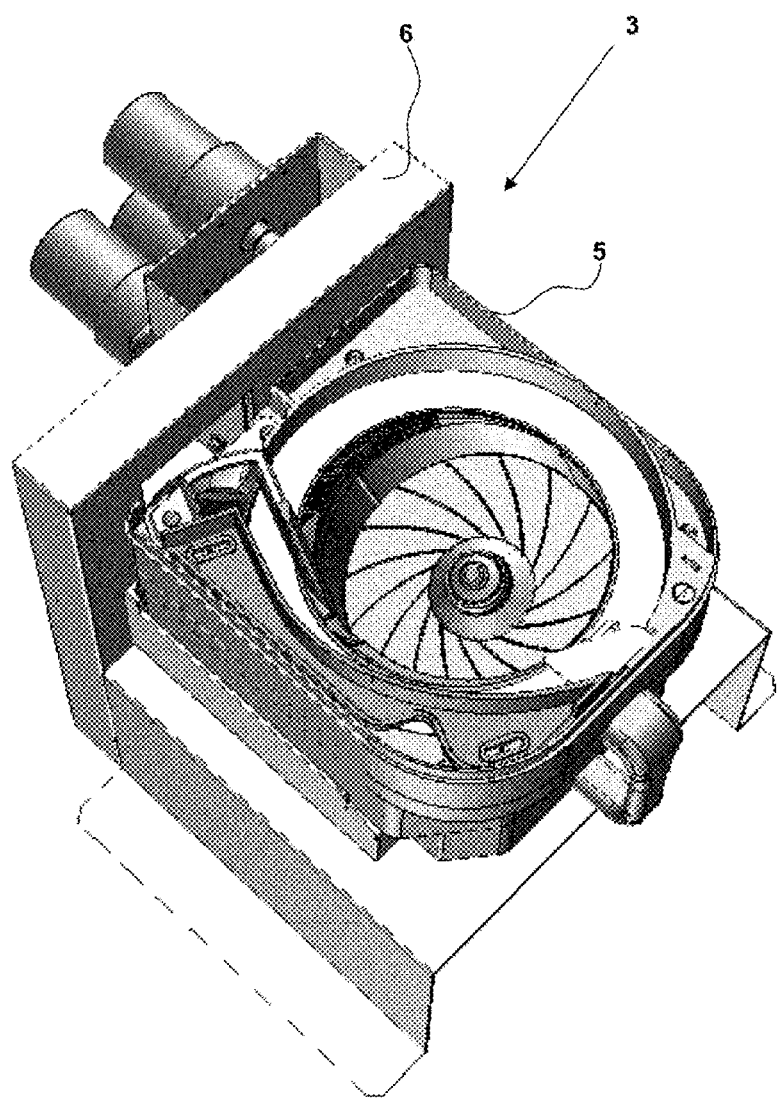
FIG. 3 is a perspective view of a medicine feeder that can be used in the medicine feeding apparatus in FIG. 1.

As shown in FIG. 3, the medicine feeders 3 includes a medicine cassette 5 and a cassette attachment section 6 to/from which the medicine cassette 5 can be attached/detached.

Figure 4:
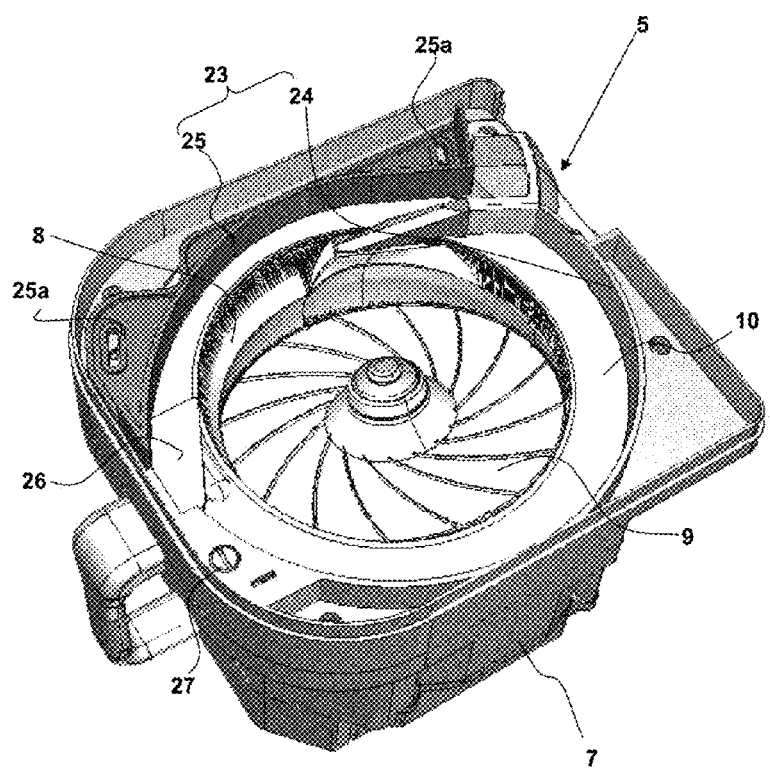
FIG. 4 is a perspective view showing the state where a first rotating body is moved to the highest position in a medicine cassette in FIG. 3.

As shown in FIG. 4, the medicine cassette 5 is formed by storing a cylindrical body 8 in a cassette body 7, storing a first rotating body 9 in the cylindrical body 8, and disposing a second rotating body 10 on the outer circumference of an opening at the upper end of the cylindrical body 8.

Figure 5:
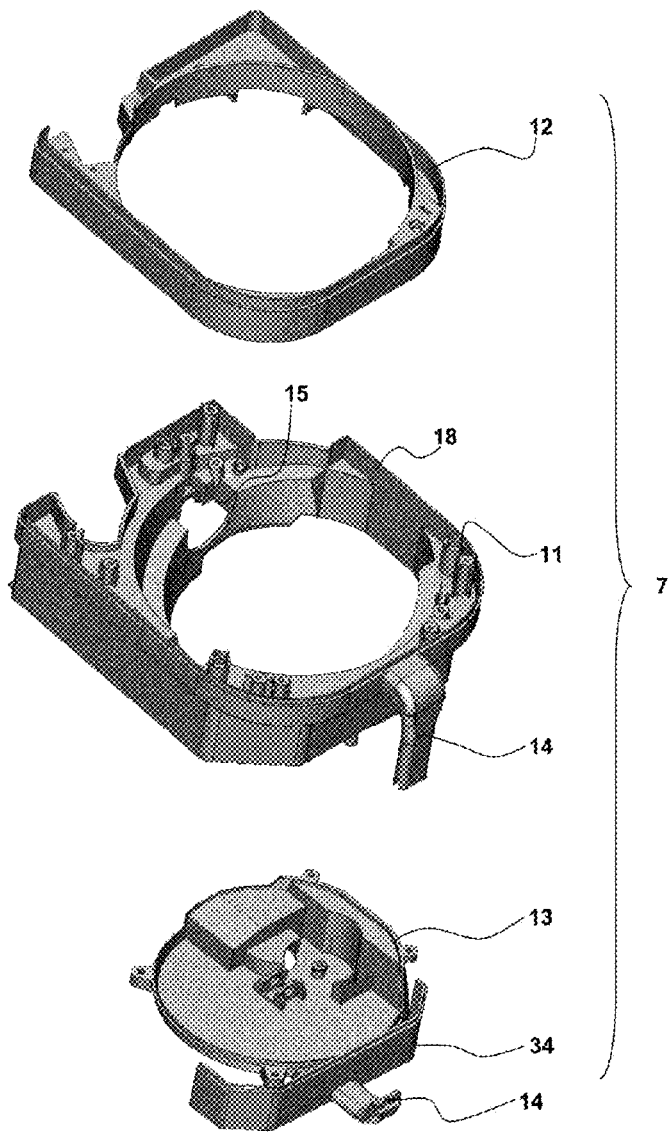
FIG. 5 is an exploded perspective view of a cassette body in FIG. 4.

As shown in FIG. 5, the cassette body 7 is formed by fixing a cover 12 on a body section 11, and fixing a base 13 under the body section 11.

Figure 6:
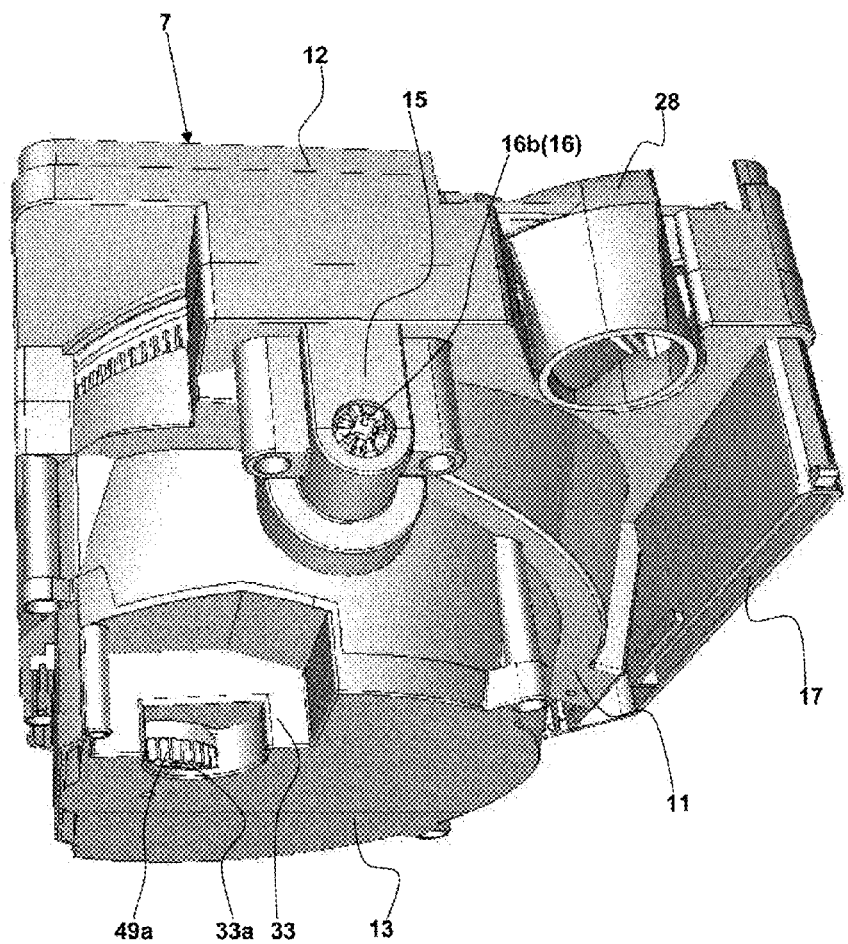
FIG. 6 is a perspective view showing the medicine cassette in FIG. 4 when viewed from below.
Figure 7:
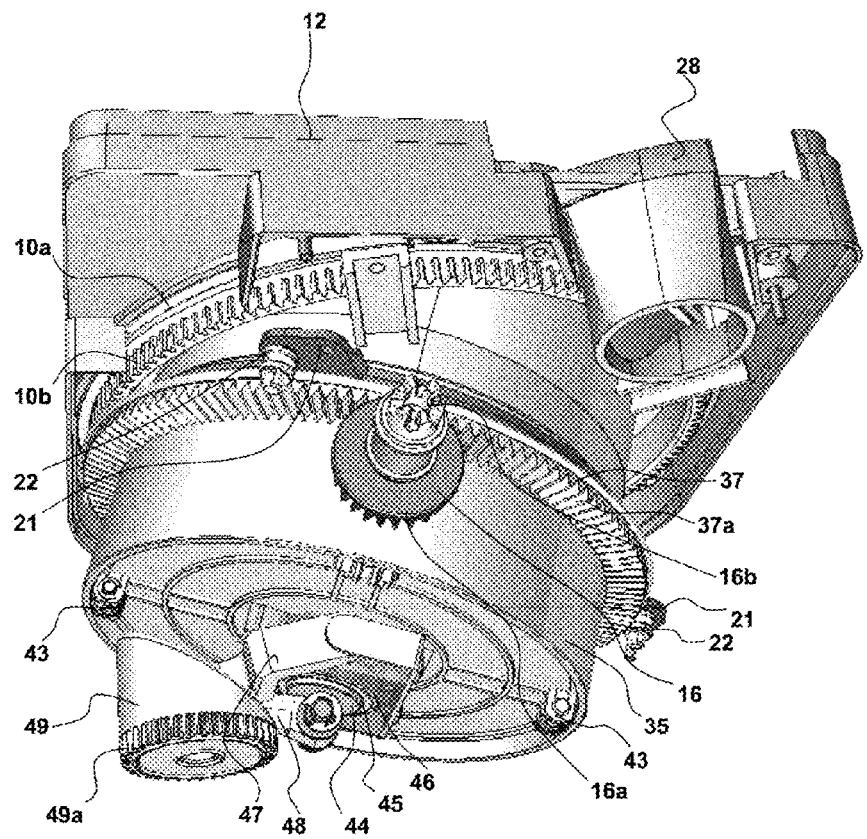
FIG. 7 is a perspective view showing the state where a body section and a base of the cassette body are detached from the medicine cassette in FIG. 6.

The body section 11 is substantially cylindrical, and has a handle 14 (except for a lower end) at the center of its front surface. As shown in FIG. 6, a bearing 15 is provided on the back surface of the body section 11, and a gear member 16 (transmitting section) is rotatably held by the bearing 15. As shown in FIG. 7, the gear member 16 includes a first gear 16a having a gear on the outer circumferential surface and a second gear 16b having a gear at a front end of a shaft extending from the center of the first gear 16a. As described later, the first gear 16a engages with a driven gear 37a of a first cylindrical section 35, and the second gear 16b engages with a driving gear 62a of the cassette attachment section 6. As shown in FIG. 6, a side wall 17 separated from the cylindrical portion is formed on one side surface of the body section 11. The side wall 17 is guided by a below-mentioned first guide rail 54 of the cassette attachment section 6.

Figure 8:
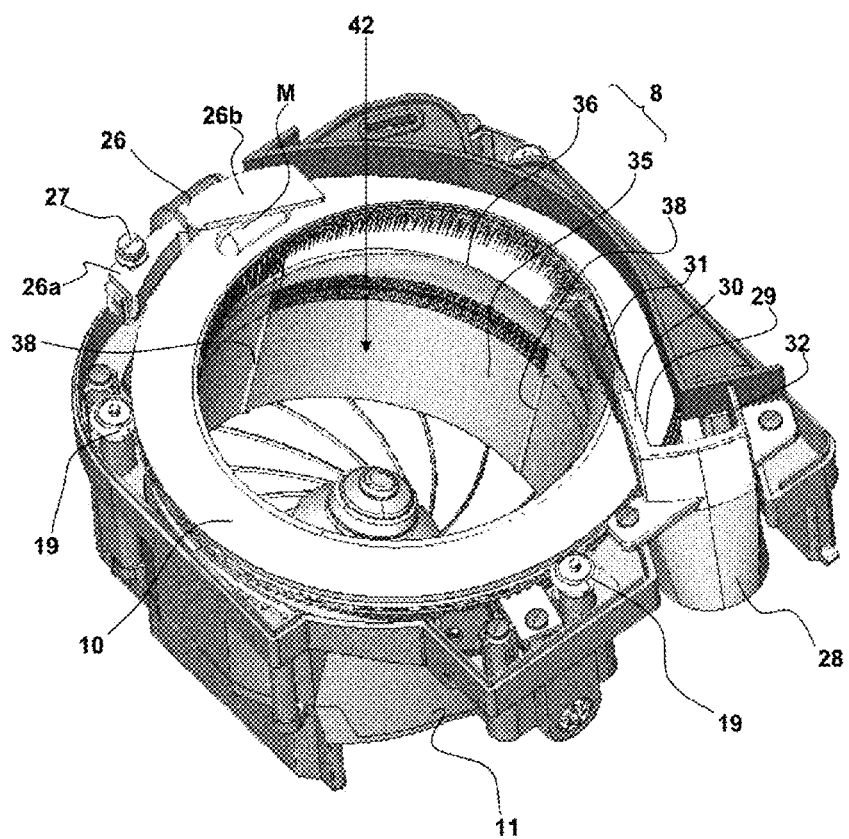
FIG. 8 is a perspective view showing the state where a cover of the cassette body is detached from the medicine cassette in FIG. 3, and the first rotating body is moved to the lowest position.
Figure 9:
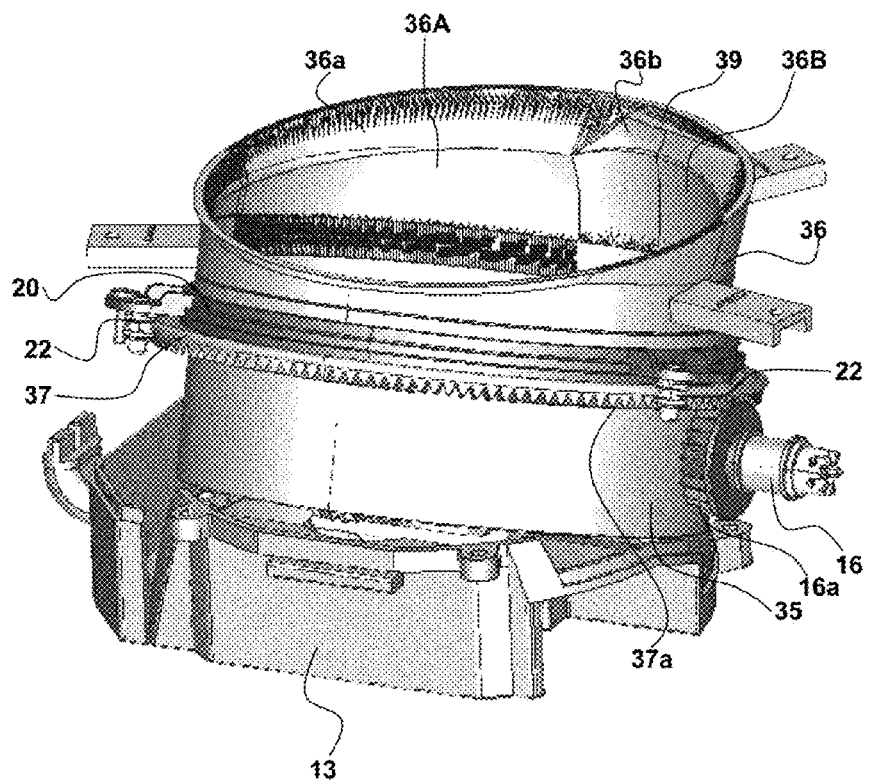
FIG. 9 is a perspective view showing mainly a cylindrical section in the medicine cassette in FIG. 3.

As shown in FIG. 5, the upper surface of the body section 11 is surrounded with a circumferential wall 18 and as shown in FIG. 8, first guide rollers 19 are rotatably disposed at regular intervals at three positions on the inner side of the wall. The first guide rollers 19 are in contact with the outer circumferential surface of the below-mentioned second rotating body 10 to rotatably support the second rotating body 10. As shown in FIG. 9, a below-mentioned second cylindrical section 36 and ring member 20 are fixed to the upper surface of the body section 11 with screws. Tongue pieces 21 are provided at substantially regular intervals at three positions on the circumference of the ring member 20 so as to extend radially outwards. Each of the tongue pieces 21 is fixed to the body section 11 with a screw, and a second guide roller 22 is attached thereto. Each of the second guide rollers 22 protrudes below the tongue piece 21, and has a groove formed of two projections on its outer circumferential surface. The groove of each second guide roller 22 guides the outer circumferential surface of an annular flange 37 of the first cylindrical section 35. That is, the ring member 20 rotatably holds the first cylindrical section 35.

As shown in FIG. 4, a cylindrical guide section 23 is formed on the upper surface of the cover 12. The cylindrical guide section 23 is configured of a guide wall 24 that occupies a half of the cylindrical portion or more and a guide member 25 that occupies the remaining portion and is fixed to the cover 12 with a screw. The outer edge of the below-mentioned second rotating body 10 is located along the inner circumferential surface of the guide wall 24. The guide member 25 has elongate holes 25a at two positions, and is attached to be able to adjust the position with respect to the cover 12 by the usage of the elongate holes 25a. The guide member 25 is attached such that its inner surface gradually protrudes from the inner circumferential surface of the guide wall 24 toward the center and then, extends toward the outer circumference. The guide member 25 thus configured limits the size (width) of medicine that can be conveyed on the second rotating body 10 such that only one piece of medicine can pass. That is, the guide member 25 functions as a width limiting section for limiting the width of medicine such that only one piece of medicine can be conveyed on the second rotating body 10.

A height limiting member 26 is attached to one end (upstream end in the medicine conveying direction) of the guide member 25 attached to the cover 12. The height limiting member 26 is disposed in a cavity formed on the outer circumferential side of the guide wall 24 of the cover 12 and as shown in FIG. 8, is configured of a fixed section 26a fixed with an adjusting screw 27 and a guide piece 26b extending from the fixed section 26a. The guide piece 26b gradually protrudes toward the inner side of the guide wall 24 in the rotating direction of the second rotating body 10. The guide piece 26b constitutes a height limiting section for limiting the height of medicine that can pass between the guide piece 26b and the upper surface of the second rotating body 10. The height limited by the guide piece 26b can be adjusted by the usage of the adjusting screw 27.

A discharge section 28 is provided at the other end (downstream end in the medicine conveying direction) of the guide member 25 attached to the cover 12. The discharge section 28 is shaped like a cylinder having a substantially rectangular cross section. The discharge section 28 has a notch 29 that can receive medicine conveyed on the second rotating body 10 at its top and a discharge guide piece 31 at the front end of one side wall (first side wall 30), and is in contact with the end surface of the guide member 25 at the front end of the other side wall (second side wall 32). The discharge guide piece 31 is configured of an attached section engaged with the first side wall 30 shaped like a cylinder having a rectangular cross section and a guide section protruding along the first side wall 30. The guide section is inclined from the upstream side toward the downstream side in the rotating direction of the second rotating body 10, and an inclined surface is formed at its front end so as to increase the distance between the guide section and the inner surface of the guide member 25.

As shown in FIG. 6, a stepped recess 33 is formed in the bottom surface of the base 13, and an opening 33a for exposing a driven gear of a below-mentioned cylindrical cam member 49 is formed in the recess. A front surface cover 34 (refer to FIG. 5) integrated with the lower end of the handle 14 is attached to the front surface side of the base 13.

As shown in FIG. 9, the cylindrical body 8 is configured of the first cylindrical section 35 and the second cylindrical section 36 located thereabove.

An annular flange 37 is formed on the upper outer circumferential surface of the first cylindrical section 35. The driven gear 37a is formed on the lower surface of the annular flange 37. The first gear 16a of the gear member 16 held on the bearing 15 of the body section 11 engages with the driven gear 37a. As shown in FIG. 8, first projections 38 (guide sections) extending in the axial direction are formed at regular intervals at four circumferential positions on the inner circumferential surface of the first cylindrical section 35. Below-mentioned guide rollers 43 of the first rotating body 9 roll on the respective first projections 38 while being guided such that the first rotating body 9 can reciprocate in the first cylindrical section 35 in the axial direction. The first cylindrical section 35 is inclined at a predetermined angle with respect to the vertical direction in the state where the medicine cassette 5 is attached to the cassette attachment section 6 of the shelf 2.

As shown in FIG. 9, the second cylindrical section 36 is connected to the top side of the first cylindrical section 35, and an opening of the upper end of the second cylindrical section 36 is inclined with respect to the plane orthogonal to the axis and is located in the horizontal plane. The inner circumferential surface of the second cylindrical section 36 gradually expands from a position close to the first cylindrical section 35 (closest position) toward a position where the discharge section 28 is disposed (position symmetrical to the closest position located on the upstream side of the discharge section 28 in the medicine conveying direction: most protruded position). Describing in detail, the inner circumferential surface of the second cylindrical section 36 gradually expands inward from the closest position to the most protruded position in the clockwise direction in a plan view, and expands the most at the most protruded position (this region will be hereinafter referred to as first expanding region 36A). The inner surface of an upper opening of the first expanding region 36A is formed of a curved surface 36a. The first expanding region 36A corresponds to the region where the guide member 25 as the width limiting section is provided. Thus, medicine that is limited by the guide member 25 and falls inward from the second rotating body 10 slips from the curved surface 36a, and is smoothly collected onto the first rotating body 9 without much shock. A second expanding region 36B further from the most protruded position is curved toward the outer diameter side, and a curved surface 36b and a flat section 39 on which the discharge guide piece 31 is located are formed on the top side of the second expanding region 36B.

Figure 10:
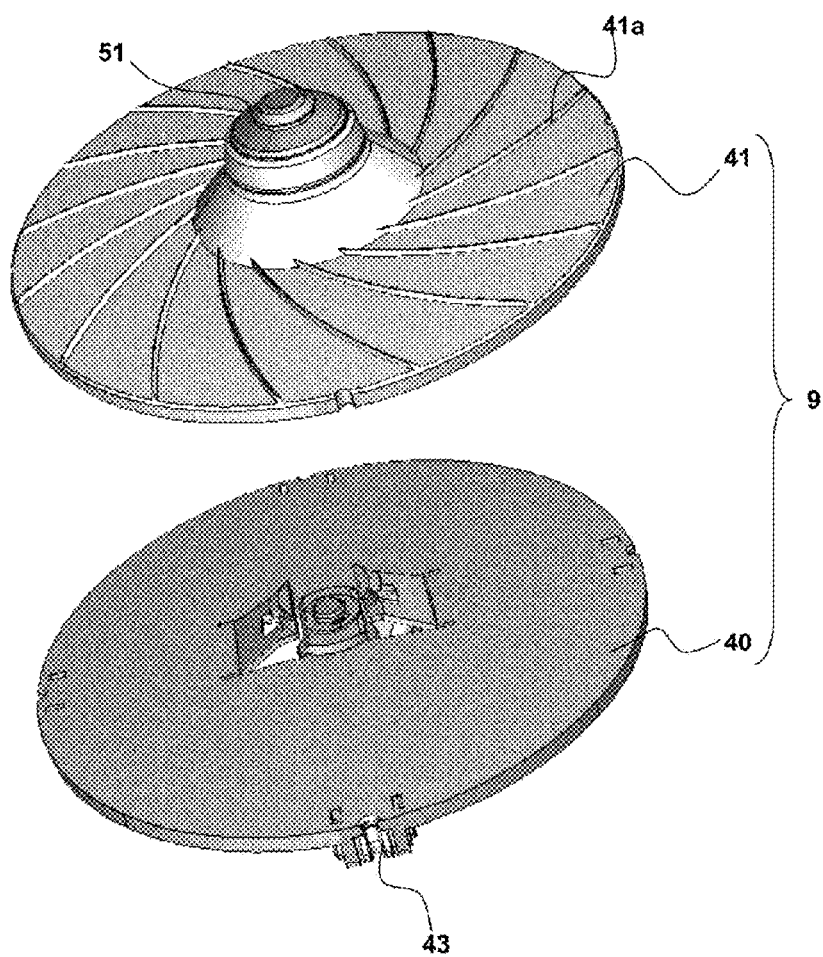
FIG. 10 is an exploded perspective view of the first rotating body in FIG. 4.

As shown in FIG. 10, the first rotating body 9 is formed by integrating the upper surface of a disc-like base plate 40 with a cover plate 41 of the same shape. The first cylindrical section 35, the second cylindrical section 36, and the first rotating body 9 constitute a medicine storage section 42 for storing medicine (refer to FIG. 8).

The guide rollers 43 are rotatably attached at regular intervals at four positions of the outer circumference of the bottom surface of the base plate 40. Each of the guide rollers 43 has a groove-like portion on its outer circumference. Since the first projections 38 formed on the inner circumferential surface of the first cylindrical section 35 are located in the respective groove-like portions, the guide rollers 43 roll along the first projections 38. Thereby, the base plate 40 can reciprocate in the axial direction of the first cylindrical section 35. When the first cylindrical section 35 rotates about its axis, since the first projections 38 are located in the respective groove-like portions of the guide rollers 43, the base plate 40 together with the first cylindrical section 35 can rotate about the axis (first rotary axis).

Figure 11:
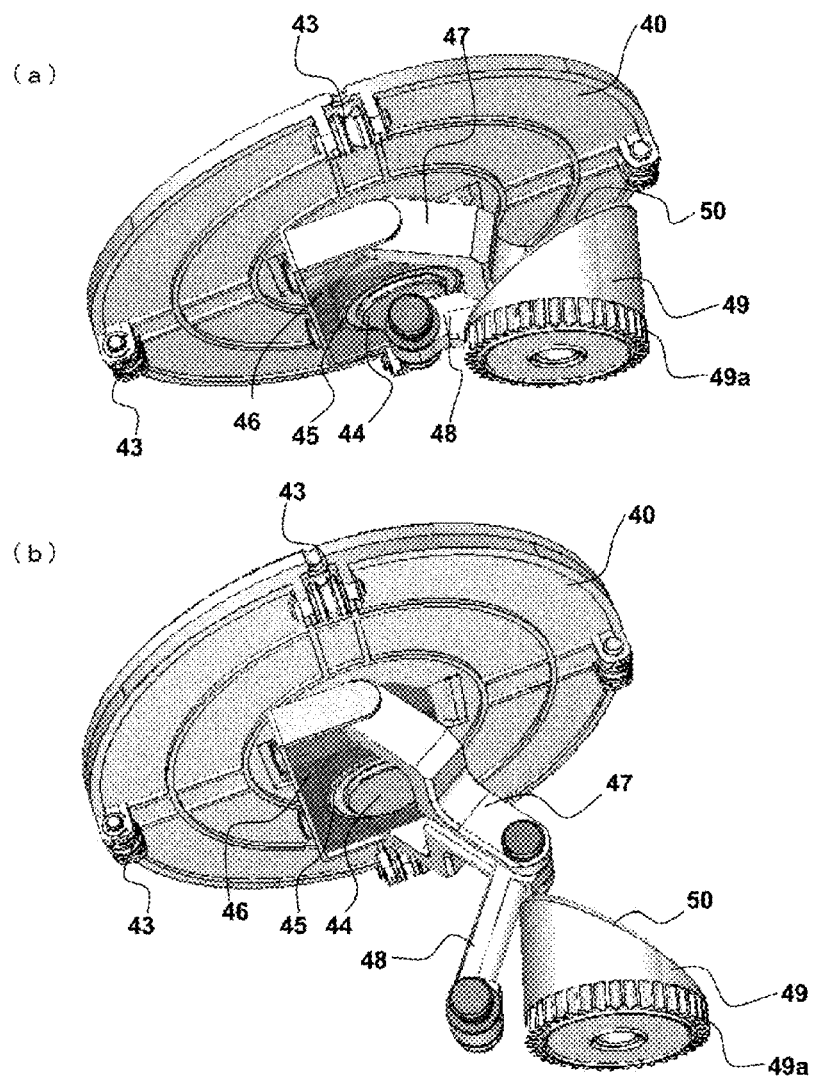
FIG. 11(a) is a perspective view showing the first rotating body in FIG. 10 moved to the lowest position and FIG. 11(b) is a perspective view showing the first rotating body in FIG. 10 moved to the highest position, when viewed from below.

As shown in FIG. 11, a shaft 44 is attached to the center of the lower surface of the base plate 40. The shaft 44 is rotatably supported by a support block 46 via a bearing 45. One end of a first link 47 is coupled to the support block 46 so as to be rotatable about a spindle. One end of a second link 48 is rotatably coupled to the other end of the first link 47, and the other end of the second link 48 is rotatably coupled to the base 13 of the cassette body 7.

The second link 48 is rotated by the cylindrical cam member 49 rotatably attached to the base 13 of the cassette body 7. The cylindrical cam member 49 is cylindrical, a driven gear 49a is formed on the outer circumferential surface of the opening at the lower end of the cylindrical cam member 49, and the opening at the upper end of the cylindrical cam member 49 is obliquely cut to form an inclined section 50. In the state where the cylindrical cam member 49 is attached to the base 13 of the cassette body 7, a below-mentioned driving gear 57a engages with a driven gear 49a via the opening formed in the base 13 to transmit power. The driven gear 49a (transmitting section) is exposed on the back surface of the medicine cassette 5.

A cap 51 is attached to the center of the cover plate 41, and a plurality of projections 41a helically extending in the opposite direction to the rotating direction are formed around the cap 51. When the first rotating body 9 rotates, these projections 41a increase friction resistance against medicine M stored in the medicine cassette 5. As a result, medicine receives a rotational force of the first rotating body 9, and is conveyed in the rotating direction and the outer-diameter direction under the effect of the helical shape of the projections 41a.

The first rotating body 9 thus configured is rotated about the first rotary axis by the rotation of the first cylindrical section 35. By positively and negatively rotating the cylindrical cam member 49, the first cylindrical section 35 reciprocates in the axial direction via the first link 47 and the second link 48. In the state where the highest portion in the opening of the upper end of the cylindrical cam member 49 contacts the second link 48, the first rotating body 9 moves highest, and part of the first rotating body 9 becomes substantially flush with the second rotating body 10. In the state where the lowest portion in the opening of the upper end of the cylindrical cam member 49 contacts the second link 48, the first rotating body 9 moves lowest, and the medicine storage volume of the medicine storage section 42 becomes maximum.

In the state where the medicine cassette 5 is detached from the cassette attachment section 6, the first rotating body 9 rotates the first link 47 and the second link 48 due to mainly the own weight, and rotates the cylindrical cam member 49 to move the cylindrical cam member 49 below the first cylindrical section 35. This can automatically form a sufficiently large space in the medicine cassette 5 storing medicine without requiring any special power.

The second rotating body 10 is shaped like a ring having a predetermined width, and is disposed around the opening of the upper end of the second cylindrical section 36. As shown in FIG. 7, an annular groove 10a and a driven gear 10b located below the annular groove 10a are formed on the outer circumferential surface of the second rotating body 10. The first guide rollers 19 attached to the body section 11 of the cassette body 7 are rollably located in the annular groove 10a, and rotatably support the second rotating body 10. As shown in FIG. 6, the driven gear 10b (transmitting section) is exposed on the back surface of the medicine cassette 5, the exposed part engages with a below-mentioned driving gear 58a provided in the cassette attachment section 6, and the second rotating body 10 can be rotatively driven about the axis (second rotary axis) extending in the vertical direction. The second rotating body 10 may be set to rotate at higher speed than the first rotating body 9. This can increase the interval of pieces of medicine transferred from the first rotating body 9 to the second rotating body 10, preventing wrong detection of the number of dispensed pieces of medicine.

Figure 12:
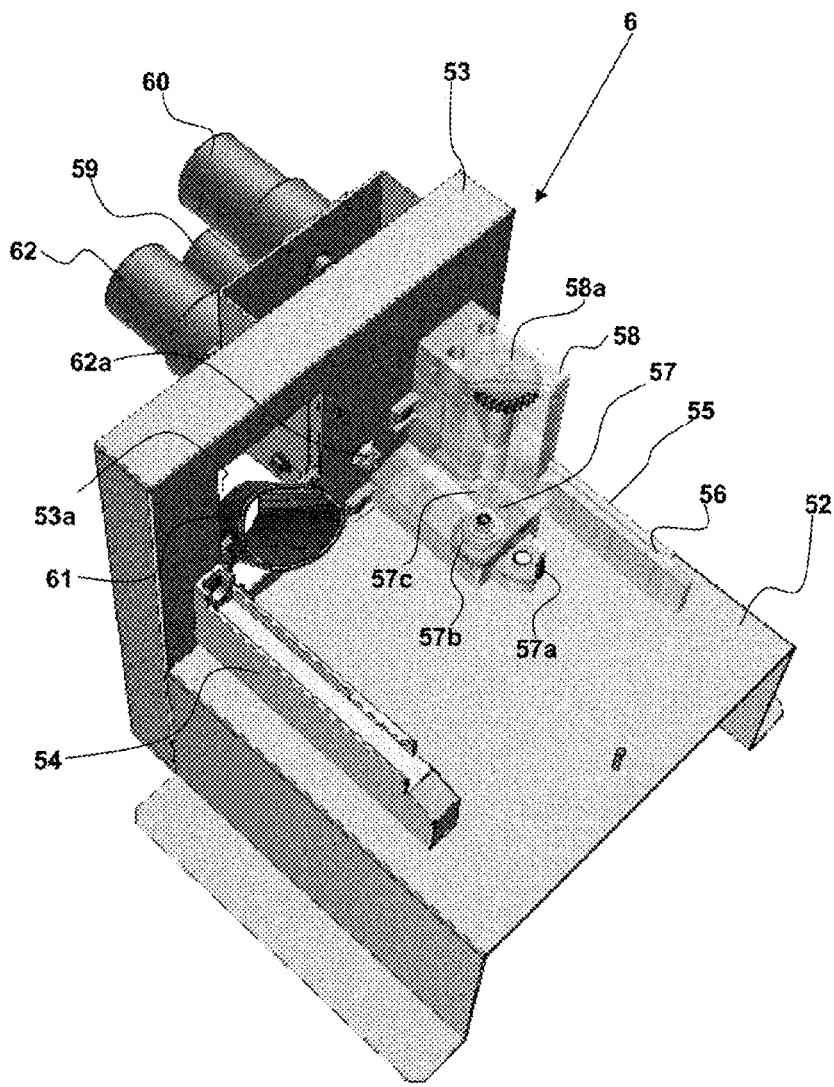
FIG. 12 is a perspective view showing a cassette attachment section in FIG. 3.

The cassette attachment section 6 is disposed in the shelf 2 of the medicine feeding apparatus in the longitudinal and lateral directions in a matrix manner. As shown in FIG. 12, the cassette attachment section 6 is configured of a mounting section 52 and a back section 53.

The mounting section 52 is configured of both side surfaces and an upper surface coupling upper edges of the side surfaces to each other. A first guide rail 54 and a second guide rail 55 that extend in the forward and rearward direction are formed at respective sides of the upper surface.

The first guide rail 54 has a groove that guides the lower end of the side wall 17 formed on the body section 11 constituting part of the cassette body 7 of the medicine cassette 5.

The second guide rail 55 is configured of a rail 56, and a first storage section 57 and a second storage section 58 that are connected to the rail 56.

The driving gear 57a engaging with the driven gear 49a of the cylindrical cam member 49, part of which is exposed, is stored in the first storage section 57. The first storage section 57 stores an intermediate gear 57b engaging with the driving gear 57a and a worm gear 57c engaging with the intermediate gear 57b. A rotating shaft of the worm gear 57c is coupled to a rotating shaft of a first motor 59. Thus, when the first motor 59 is driven, power is transmitted to the cylindrical cam member 49, thereby positively and negatively rotating the cylindrical cam member 49.

The driving gear 58a engaging with the driven gear 37a of the first cylindrical section 35, part of which is exposed, is stored in the second storage section 58. A worm gear (not shown) is fixed to a rotating shaft of the driving gear 58a, and is engaged with another worm gear (not shown) provided at the shaft 44 coupled to a rotating shaft of a second motor 60. When the second motor 60 is driven, the second rotating body 10 rotates.

One side of the back section 53 has an opening 53a, and a discharge tube 61 connected to the discharge section 28 provided in the medicine cassette 5 is attached to the one side. The first motor 59, the second motor 60, and a third motor 62 are attached to the other side of the back section 53. The action of the first motor 59 and the second motor 60 is described above. In the third motor 62, the driving gear 62a is integrated with a shaft member coupled to a rotating shaft, and the driving gear can protrude from the back section 53 and engage with the second gear 16b of the medicine cassette 5. When the third motor 62 is driven, the driving gear 62a rotates, resulting in that the gear member 16 rotates through the second gear 16b engaging with the driving gear 62a, and the first rotating body 9 in the medicine cassette 5 through the first gear 16a and the driven gear 37a engaging with the first gear 16a rotates. As described above, by providing all of the driving members for driving the medicine cassette 5 (the first motor 59, the second motor 60, and the third motor 62) on the back section 53, the members on the side of the medicine cassette 5 (the first rotating body 9 and the second rotating body 10) can be driven on the side of the same surface (front surface of the back section 53).

Figure 13:
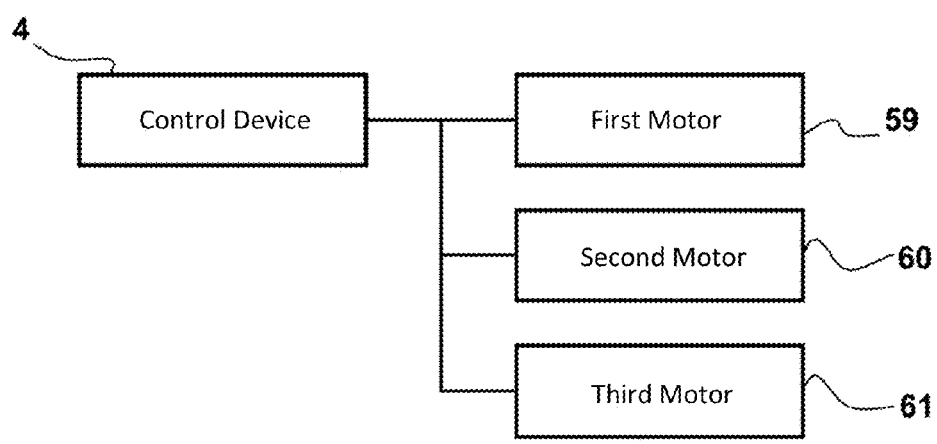
FIG. 13 is a block diagram of the medicine feeding apparatus according to the first embodiment.

As shown in FIG. 13, the controller 4 receives prescription data from a server not shown and input signals from various sensors to control driving of each of the motors 59, 60, and 61.

Figure 14:
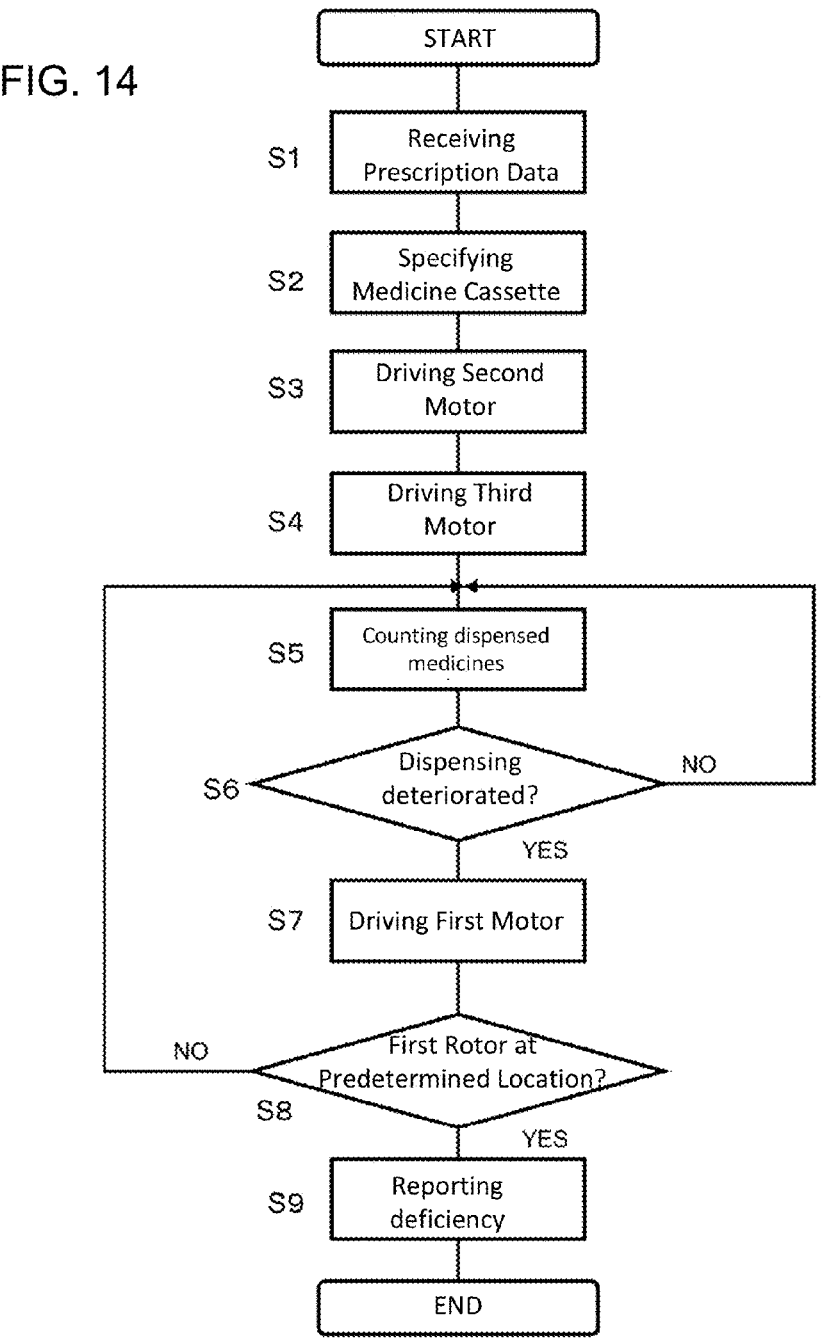
FIG. 14 is a flow chart showing medicine dispensing processing in the medicine feeding apparatus according to the first embodiment.

Next, the operation of the medicine feeding apparatus thus configured will be described with reference to a flow chart in FIG. 14.

The prescription data is received from the server not shown (Step S1), and the medicine cassette 5 that stores medicine contained in the prescription data is identified (Step S2). At this time, although not shown, a patient container is moved to the identified medicine cassette 5 by the usage of a conveying means such as a robot arm.

In the identified medicine cassette 5, the second motor 60 is driven to start rotation of the second rotating body 10 (Step S3), and the third motor 62 is driven to start rotation of the first rotating body 9 (Step S4). Thereby, medicine stored in the medicine cassette 5 moves to the outer circumference while being rotated by the rotation of the first rotating body 9. The first cylindrical section 35 and the second cylindrical section 36 are obliquely disposed in the vertical direction, and medicine stored in the medicine storage section 42 is closest to the second rotating body 10 at the closest position of the second cylindrical section 36. For this reason, the medicine moving to the outer circumference moves onto the second rotating body 10 mainly in the vicinity of the closest position of the second cylindrical section 36.

The medicine moving onto the second rotating body 10 is conveyed by the rotation of the second rotating body 10, and accumulated medicine, etc. is returned to the medicine storage section 42 by the height limiting member 26. Subsequently, since the exposed portion of the second rotating body 10 is gradually narrowed by the guide member 25, pieces of medicine remaining on the second rotating body 10 can pass only one by one, and left pieces are smoothly returned to the medicine storage section 42 along the curved surface of the second cylindrical section 36. Passed medicine is guided by the guide member 25 and the discharge guide piece 31, and is discharged from the discharge section 28. At this time, the sensor (not shown) provided in the conveying means detects medicine to count the number of dispensed pieces of medicine (Step S5).

In this manner, medicine in the medicine storage section 42 is sequentially dispensed, and the position of the first rotating body 9 is moved upward according to the medicine dispensing state. That is, a sensor not shown detects whether or not medicine is present on the second rotating body 10, and it is determined whether or not the medicine dispensing state deteriorates depending on that medicine cannot be detected, or a time interval at which medicine discharged from the discharge section 28 is detected exceeds a predetermined time, etc. (Step S6). When the state deteriorates, the first motor 59 is driven (Step S7), the cylindrical cam member 49 is rotated via various gears. The inclined section 50 of the cylindrical cam member 49 causes the second link 48 to slide from a low position to a high position, thereby rotating the second link 48. Thus, the first rotating body 9 moves upward in the first cylindrical section 35 via the first link 47. As a result, medicine in the medicine storage section 42 can be smoothly moved onto the second rotating body 10 depending on the dispensing state. As shown in FIG. 4, when the first rotating body 9 moves to the highest position or a predetermined position at the front of the highest position (Step S8), it is informed that medicine should be refilled (Step S9).

The sensor for detecting whether or not medicine is present on the second rotating body 10 may be an optical sensor provided in the above-mentioned conveying means such as the robot arm. The use of the optical sensor eliminates the necessity for a sensor in each medicine cassette 3 provided in the shelf of the apparatus body 1, reducing costs. To transmit light from the optical sensor in the conveying means onto the second rotating body 101, the cylindrical guide section 23 may have a hole penetrating from the outer circumferential surface to the inner circumferential surface. Without such case, the optical sensor needs to be provided in the conveying means so as to prevent light of the optical sensor from blocking by the cylindrical guide section 23. However, such problem can be solved by providing the hole. In place of forming the hole, part of the cylindrical guide section 23 may be made transparent.

When it is informed that medicine should be refilled in the medicine storage section 42, the medicine cassette 5 is detached from the cassette attachment section 6 to refill medicine. In this case, the cylindrical cam member 49 is released from engagement with the driving gear 62a of the cassette attachment section 6, and is put into the rotatable state. As a result, the first rotating body 9 moves to the lowest position due to the own weight as shown in FIG. 8, without requiring any special power source, resulting in that the volume of the medicine storage section 42 becomes maximum for refilling of medicine.

Second Embodiment

Figure 15:
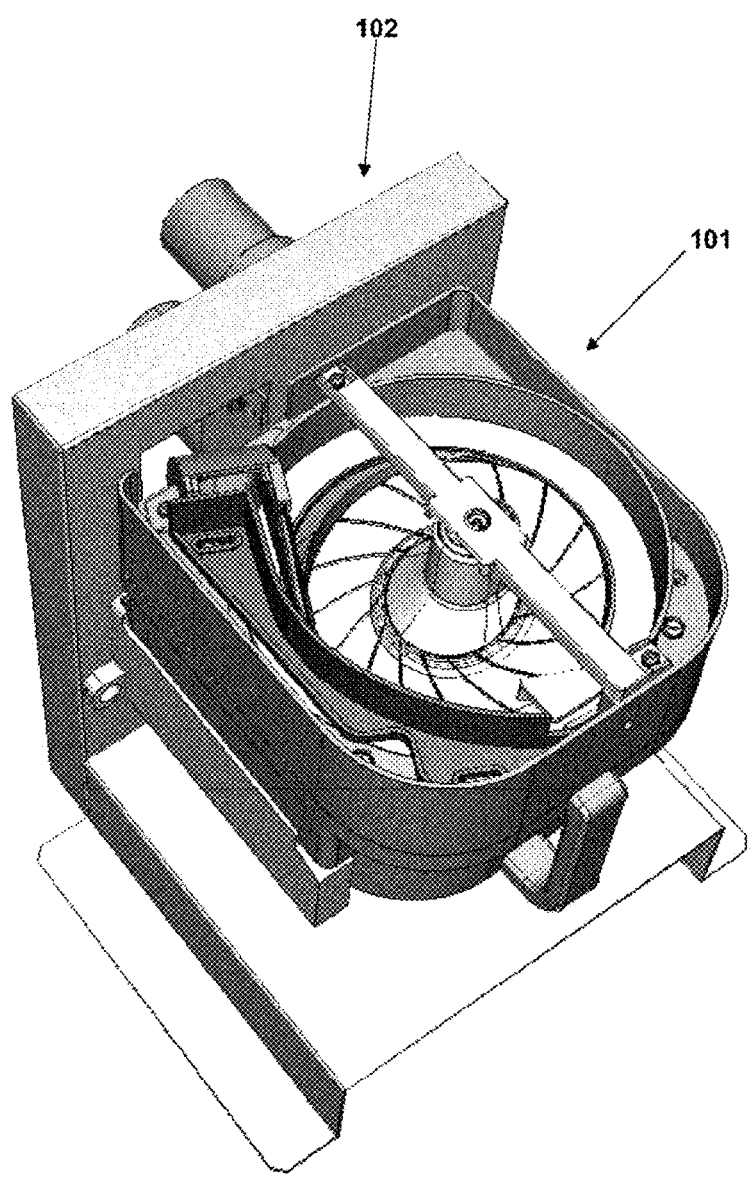
FIG. 15 is a perspective view of a medicine feeder according to a second embodiment.

FIG. 15 shows a medicine feeder 3 according to a second embodiment. The medicine feeder 3 is configured of a medicine cassette 101 and a cassette attachment section 102 to/from which the medicine cassette 101 can be attached/detached.

Figure 16:
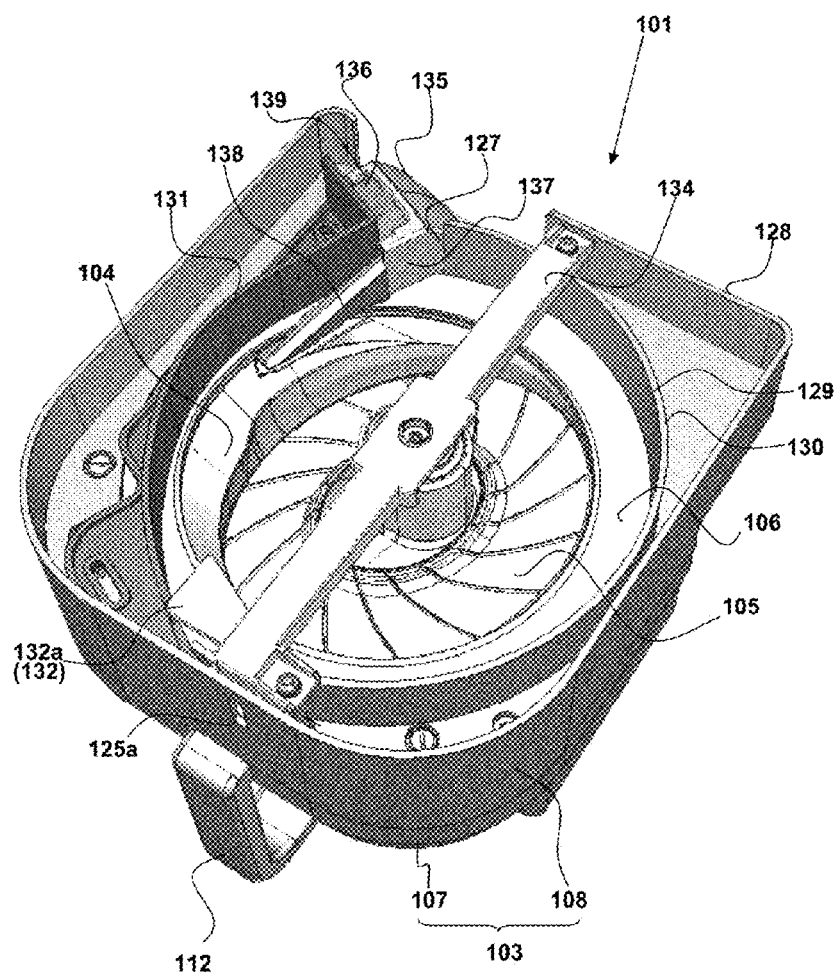
FIG. 16 is a perspective view of a medicine cassette in FIG. 15.

As shown in FIG. 16, in the medicine cassette 101, a cylindrical body 104 is stored in a cassette body 103, a first rotating body 105 is stored in a cylindrical body 104, and a second rotating body 106 is disposed on the outer circumference of an opening at the upper end of the cylindrical body 104.

Figure 17:
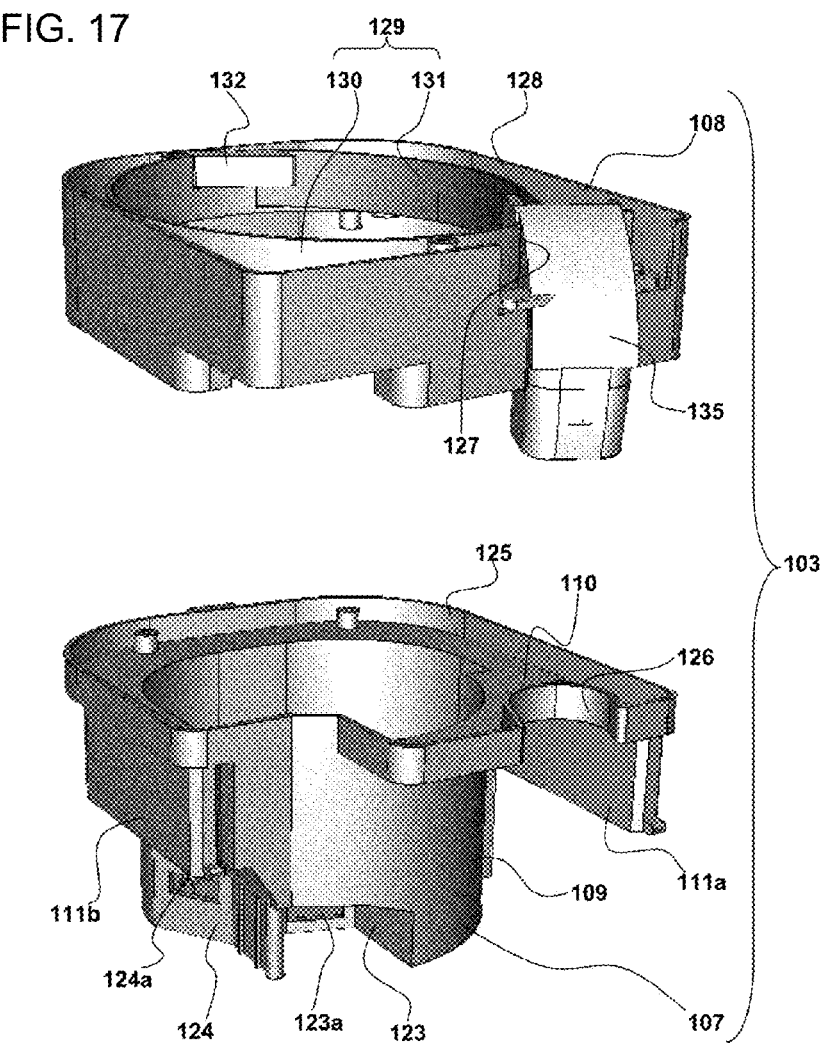
FIG. 17 is an exploded perspective view of the cassette body in FIG. 16.

As shown in FIG. 17, the cassette body 103 is formed by fixing a cover 108 above a body section 107.

The body section 107 is configured of a bottomed cylindrical section 109, a flange 110 formed on an upper end opening part of the bottomed cylindrical section 109, and both side walls 111a and 111b extending from the flange 110 along the bottomed cylindrical section 109. A handle 112 (refer to FIG. 16) is formed at the center of the front surface of the bottomed cylindrical section 109. A power transmission mechanism is disposed on the bottom surface of the bottomed cylindrical section 109.

Figure 18:
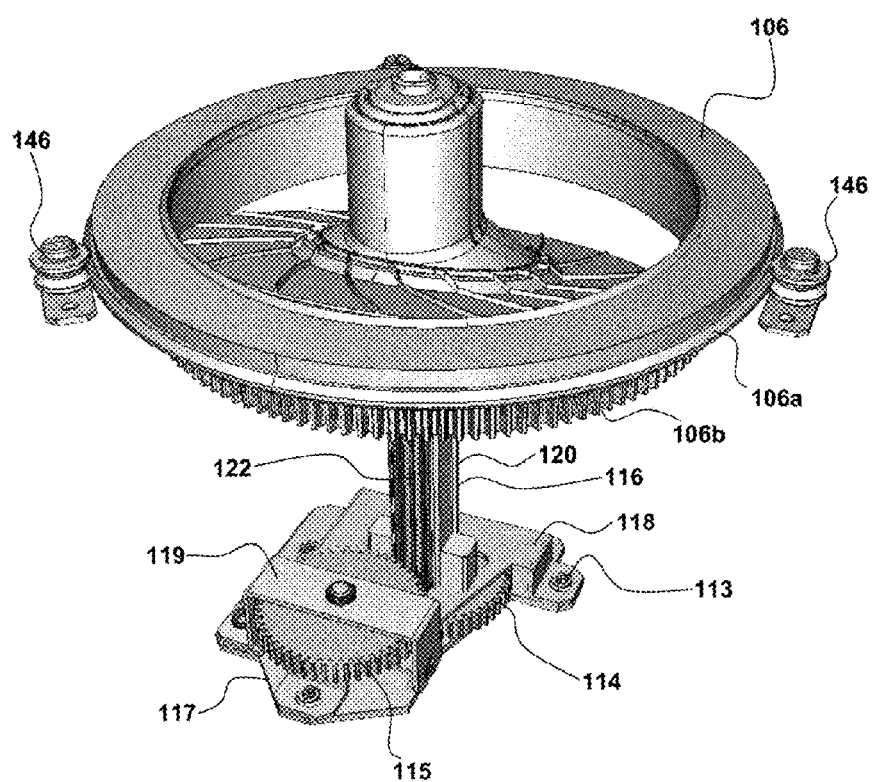
FIG. 18 is a perspective view showing a second rotating body and a power transmission mechanism in FIG. 16.
Figure 19:
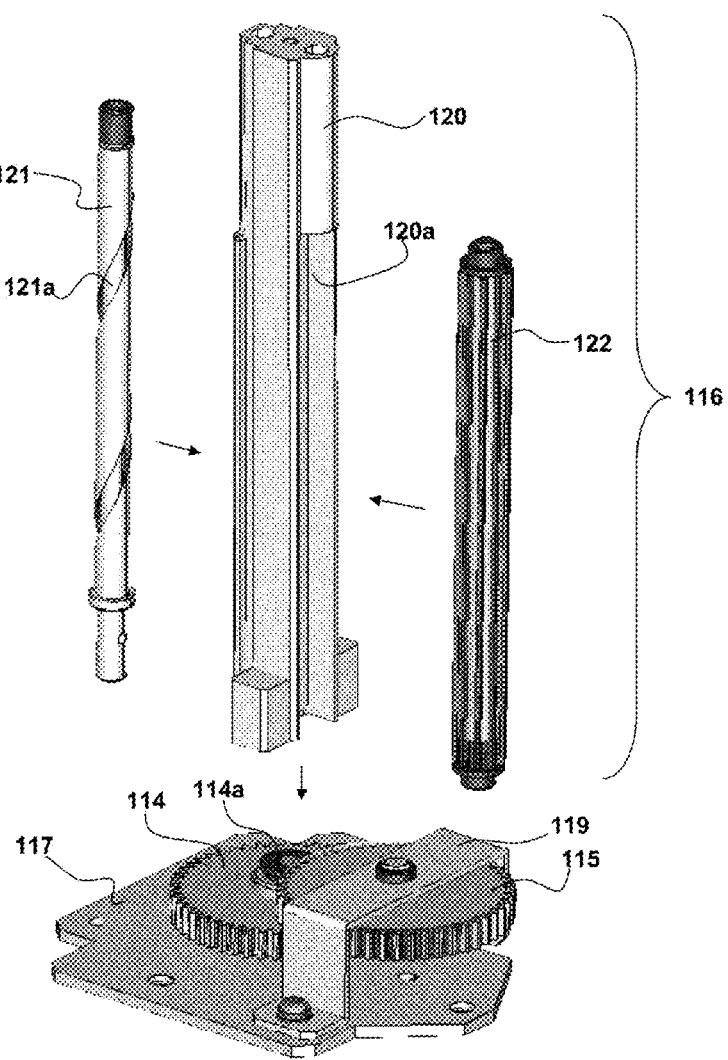
FIG. 19 is an exploded perspective view showing a shaft member in FIG. 16.

As shown in FIG. 18 and FIG. 19, the power transmission mechanism is formed by attaching a first driven gear 114, a second driven gear 115, and a shaft member 116 to an attachment table 113.

The attachment table 113 is formed by integrating a first attachment plate 117 with a second attachment plate 118. The first driven gear 114 is disposed between the first attachment plate 117 and the second attachment plate 118, and supported to be able to rotate about a first shaft member 121. The second driven gear 115 is disposed on the upper surface of the second attachment plate 118, and can rotate about a spindle between the plate 118 and a guide plate 119.

A shaft member unit 116 includes a shaft guide 120 attached between the second attachment plate 118 and a below-mentioned reinforcing beam 134. As shown in FIG. 19, the shaft guide 120 has a groove 120a on each side (one of them is not shown). The first shaft member 121 and a second shaft member 122 are disposed in the respective grooves. The first shaft member 121 is coupled to a first spindle 114a of the first driven gear 114 and extends upward, and a helical groove 121a is formed in the outer circumferential surface of the first shaft member 121 from the lower end side toward the upper end side. A vertical gear extending in the longitudinal direction is formed on the outer circumferential surface of the second shaft member 122. A second dependent gear 115 and a below-mentioned inner circumferential gear 157 of the first rotating body 105 are engaged with the vertical gear of the second shaft member 122.

As shown in FIG. 17, a first recess 123 having a first opening 123a and a second recess 124 having a second opening 124a are formed in the bottom surface of the bottomed cylindrical section 109. The first driven gear 114 is exposed from the first opening 123a, and the second driven gear 115 is exposed from the second opening. As described later, a first support part of the cassette attachment section 102 is located in the first recess 123, and a first driving gear 167 engages with the first driven gear 114. A second support part of the cassette attachment section 102 is located in the second recess 124, and a second driving gear 168 engages with the second driven gear 115.

The circumferential edge of the flange 110 is formed of a circumferential wall 125, and a depressed section 126 is formed in part of the wall. The depressed section 126 serves to avoid interference with a discharge section 135. A below-mentioned flange 141 of the cylindrical body 104 is fixed to the flange 110 with a screw. Both the side walls 111a and 111b are held by below-mentioned guide rails 165 and 166 of the cassette attachment section 102, respectively.

A notch 127 is formed in part of the annular cover 108, and the below-mentioned discharge section 135 can be arranged by using the notch 127 and the depressed section 126 of the body section 107. A circumferential wall 128 is formed on the outer edge of the upper surface of the cover 108, and a cylindrical guide section 129 is formed on the inner side thereof. The cylindrical guide section 129 is configured of a guide wall 130 that occupies a half of the cylindrical section or more and a guide member 131 that occupies the remaining portion and is fixed to the cover 108 with a screw. The outer edge of the below-mentioned second rotating body 106 is located along the inner circumferential surface of the guide wall 130. The guide member 131 has elongate holes at two positions, and can be adjusted its position with respect to the cover 108 by using the elongate holes. The guide member 131 is attached such that the inner surface of it gradually expands from the inner circumferential surface of the guide wall 130 to the center and then, extends toward the outer circumference. The guide member 131 gradually decreases the exposed portion of the second rotating body 106 in this manner, limiting the size (width) of conveyable medicine such that pieces of medicine can pass one by one.

A height limiting member 132 is attached to one end (medicine conveying direction upstream end) of the guide member 131 attached to the cover 108. As shown in FIG. 16, the height limiting member 132 is configured of a fixed section (not shown) fixed with an adjusting screw (not shown) via a elongate hole 125a formed in the circumferential wall 125 and a guide piece 132a extending from the fixed section. The guide piece 132a gradually protrudes in the guide wall 130 toward the downstream side in the rotating direction of the second rotating body 106. The guide piece 132a constitutes a height limiting section for limiting the height of medicine that can pass through, between the guide piece and the upper surface of the second rotating body 106. The height limited by the guide piece 132a can be adjusted by changing the screwing position of the adjusting screw via the elongate hole 125a.

The reinforcing beam 134 extends from the position near the fixed section of the height limiting member 132 to the position symmetrical to the position near the fixed section about the second shaft member 122. The upper end of the shaft guide 120 is fixed to the center of the reinforcing beam 134. When the strength of the shaft guide is sufficient, the reinforcing beam 134 is not essential.

The discharge section 135 is provided at the other end (downstream end in the medicine conveying direction) of the guide member 131 attached to the cover 108. The discharge section 135 is shaped like a cylinder having a substantially rectangular cross section. A notch 136 that can receive medicine conveyed on the second rotating body 106 is formed at the top of the discharge section 135, a discharge guide piece 138 is attached to the front end of one side wall (first side wall 137), and the front end of the other side wall (second side wall 139) is in contact with the end surface of the guide member 131. The discharge guide piece 138 is configured of an attached section engaged with the first side wall 137 shaped like a cylinder having a rectangular cross section, and a guide section protruding along the first side wall 137. An inclined surface is formed at the front end of the guide section so as to gradually increase the distance between the guide section and the inner surface of the guide member 131 toward the front end.

Figure 20:
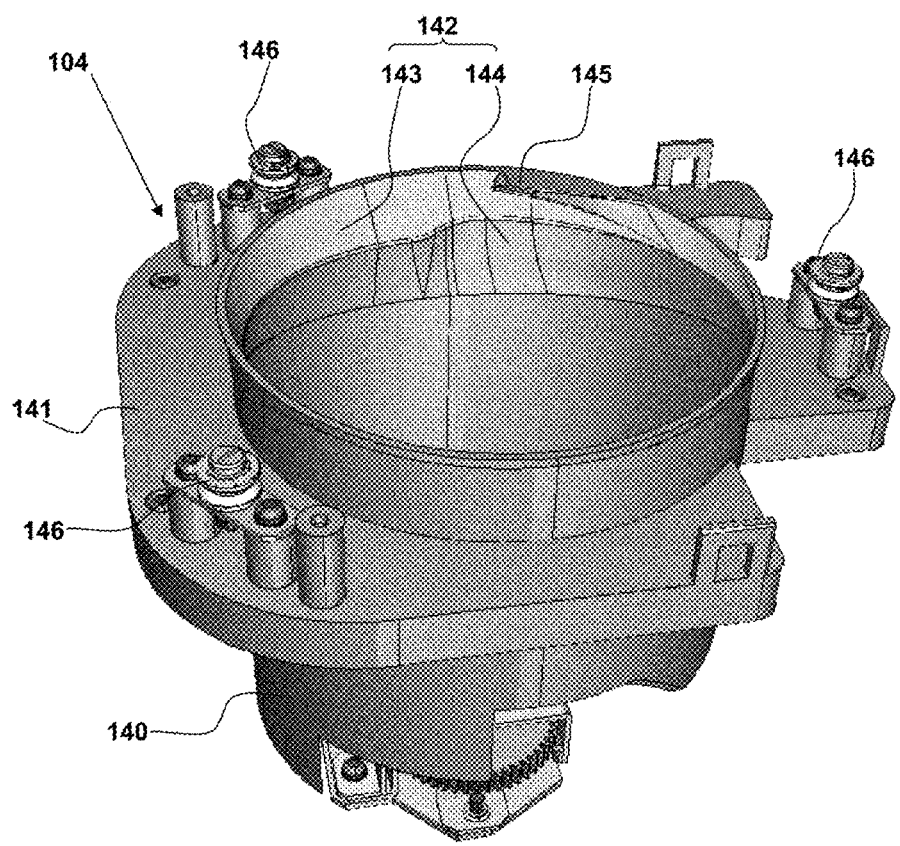
FIG. 20 is a perspective view showing a cylindrical body in FIG. 16.

As shown in FIG. 20, the cylindrical body 104 is configured of a cylindrical section 140 and a flange 141 formed on the outer circumferential surface of the cylindrical body 104 in the upper portion of the cylindrical section 140. Almost half of the inner circumferential surface of an upper end opening part of the cylindrical section 140 is configured of an expanding section 142 expanding inward. The inner circumferential surface of an upper end opening part of the expanding section 142 is configured of a first expanding area 143 that is a curved surface gradually expanding inward in the clockwise direction from the left in FIG. 20, that is, toward the discharge section 135, and a second expanding area 144 gradually expanding toward the outer side in the clockwise direction from a slightly outer position than the first expanding area 143. The inner surface of the opening at the upper end of the expanding section 142 is formed of a curved surface. However, part of the upper end surface of the second expanding area 144 is flush with the opening upper end of the cylindrical section 140 to become a below-mentioned flat section 145 where the discharge guide piece 138 is disposed. Guide rollers 146 are attached to the upper surface of the flange 110 at three positions at substantially regular intervals. The guide rollers 146 rotatably support the below-mentioned second rotating body 106.

Figure 21:
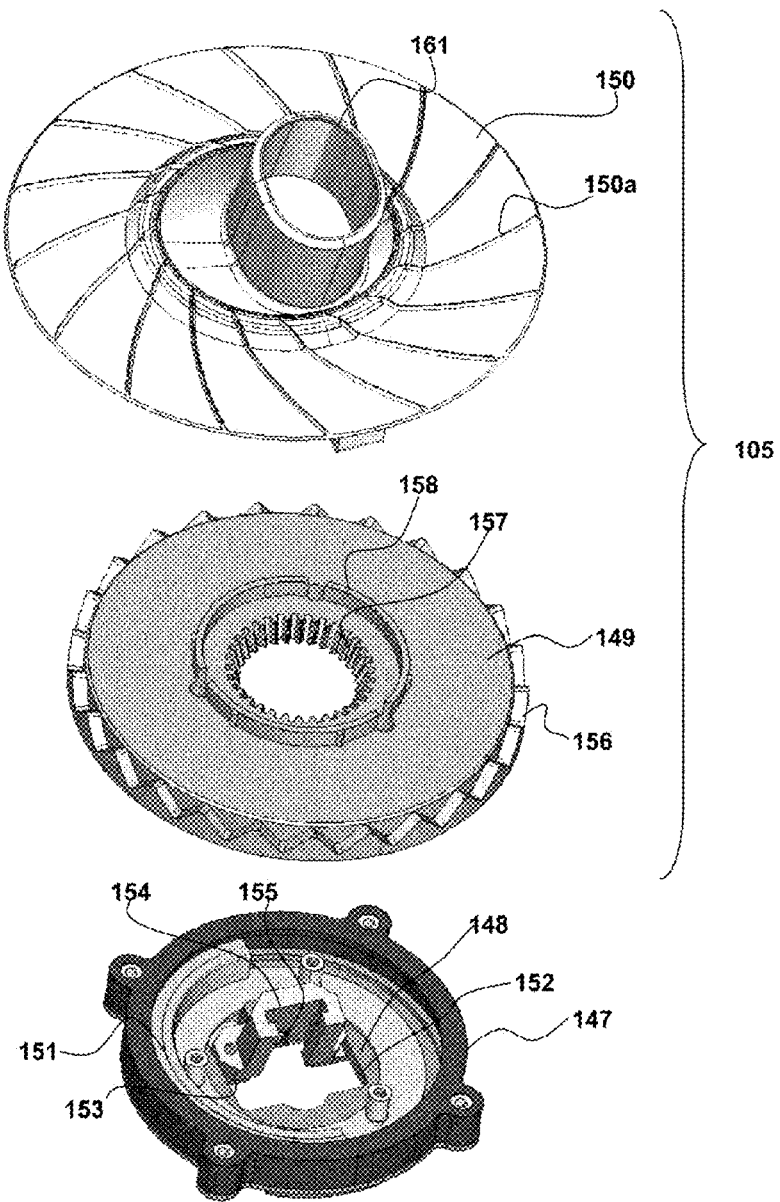
FIG. 21 is an exploded perspective view showing a first rotating body in FIG. 16.
Figure 22:
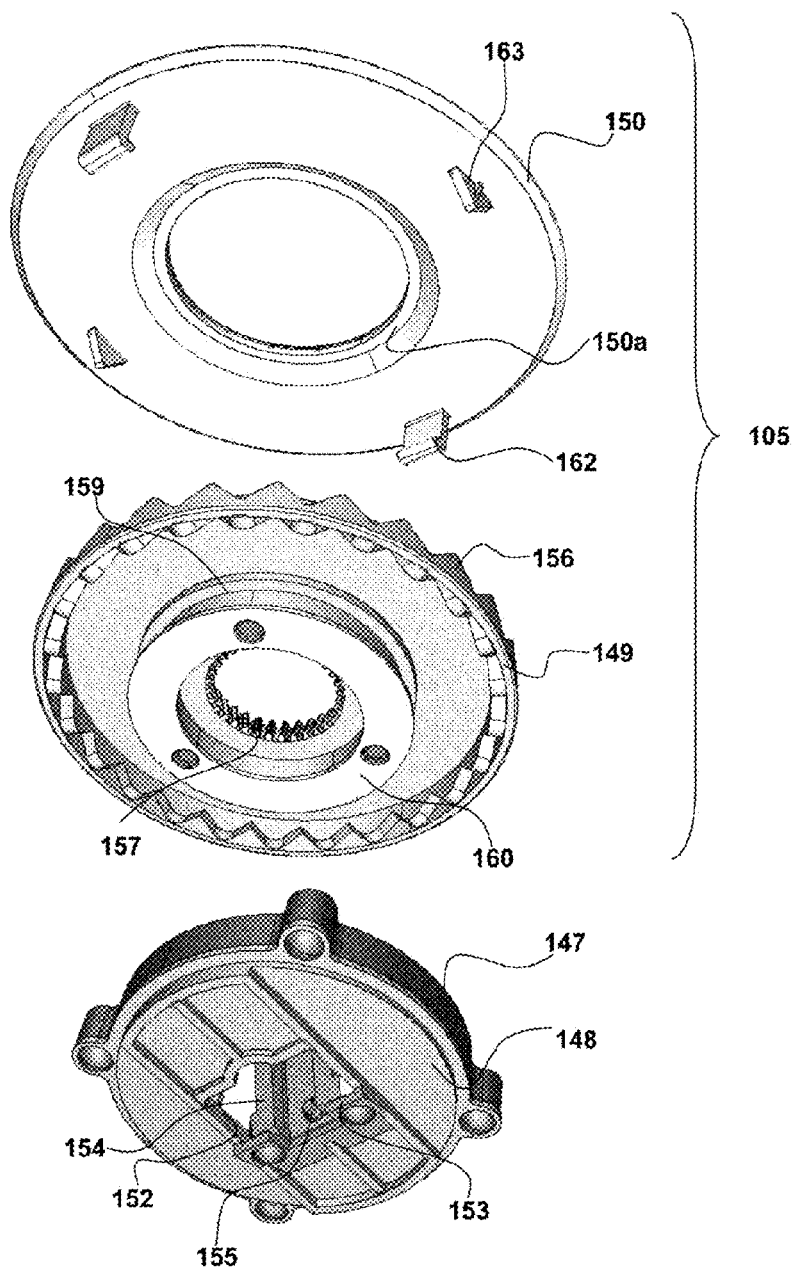
FIG. 22 is an exploded perspective view of the first rotating body in FIG. 21 when viewed from below.

As shown in FIG. 21 and FIG. 22, the first rotating body 105 includes a disc gear base 149 rotatably supported by a bearing member 147 and a disc plate 150 attached to the disc gear base 149. The bearing member 147 is annular, and an lower opening end part of the bearing member 147 is covered with a circular closing plate 148. The first rotating body 105 and the cylindrical body 104 form a bottomed cylindrical medicine storage section 133.

An annular bearing 151 (only a half is shown in FIG. 21) is disposed on the inner circumferential surface of the bearing member 147 to rotatably support a second annular wall 159 protruding from the lower surface of the disc gear base 149. The bearing member 147 is inclined with respect to a plane orthogonal to the axis (second rotary axis) of the cylindrical body 104.

Figure 23:
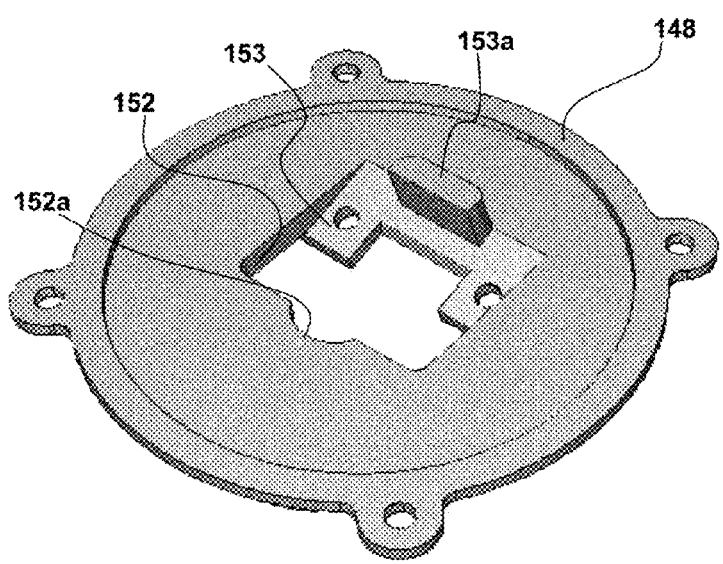
FIG. 23 is a perspective view showing a closing plate in FIG. 21.

As shown in FIG. 23, an insertion hole 152 into which the shaft member unit 116 can be inserted is formed at the center of the closing plate 148. The insertion hole 152 is substantially rectangular, an arcuate recess 152a is formed at the center of one long side, and a tongue piece 153 extends from the other long side in the obliquely downward direction. The tongue piece 153 protrudes at both sides, and has a protrusion 153a at the center of the upper surface (notched and dented area). As shown in FIG. 21, a guide block 154 is fixed to the upper surface of the tongue piece 153. The guide block 154 is fixed to the tongue piece 153 with a screw, and the fixing is reinforced by the protrusion. The guide block 154 guides part of the shaft guide 120 of the shaft member unit 116, and prevents the first rotating body 105 from being displaced during sliding along the shaft member unit 116. A guide pin 155 is attached to the guide block 154. The guide pin 155 is located in the helical groove 121a of the first shaft member 121, and moves along the helical groove 121a with the rotation of the first shaft member 121. Thereby, the first rotating body 105 moves up and down via the guide block 154.

An upwardly protruding outer circumferential gear 156 is formed on the outer circumferential surface of the disc gear base 149. A conical inner circumferential gear 157 gradually extending inward toward the lower side is formed on the inner circumferential surface of a central hole of the disc gear base 149. The inner circumferential gear 157 engages with the vertical gear formed on the outer circumferential surface of the second shaft member 122 of the shaft member unit 116. A first annular wall 158 is formed on the upper surface of the disc gear base 149 on the outer diameter side of the central hole. The second annular wall 159 is formed on the lower surface of the disc gear base 149 on the outer diameter side of the central hole. An annular plate 160 is fixed to the lower end surface of the second annular wall 159 with a screw.

Figure 24:
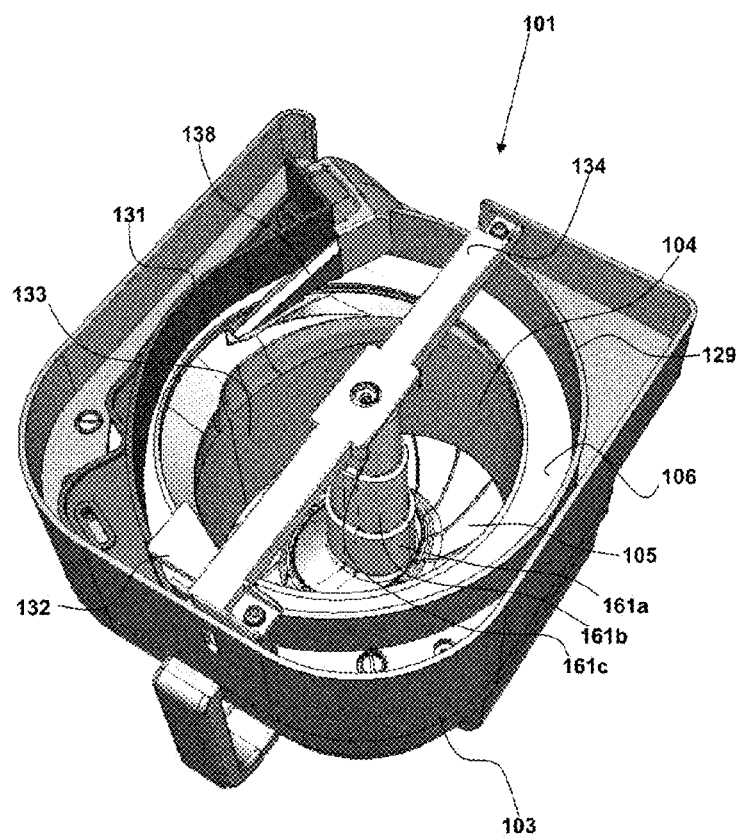
FIG. 24 is a perspective view showing the state where the first rotating body is moved downward in the medicine cassette in FIG. 16.

An opening 150a is formed at the center of the disc plate 150. A fringe of the opening 150a protrudes upward from the remaining portion. A cylindrical cover 161a is attached to the opening. As shown in FIG. 24, two covers (an intermediate cover 161b and a small cover 161c), the outer diameter of which is decreased in a stepped manner, are disposed in the cylindrical cover 161a. The small cover 161c can be stored in the intermediate cover 161b, and the intermediate cover 161b can be stored in the cylindrical cover 161a. As a result, the first rotating body 105 can move up and down along the shaft member unit 116 while the shaft member unit 116 is covered with the cylindrical cover 161a and the covers 161b and 161c.

As shown in FIG. 21, a plurality of projections 150a helically extending from the side of the inner circumferential gear 157 to the downstream side in the rotating direction are formed on the upper surface of the disc plate 150. When the disc plate 150 rotates, these projections 150a accessorily act to smoothly convey medicine in the circumferential direction and the outer-diameter direction.

As shown in FIG. 22, locking claws 162 are formed on the outer circumference of the lower surface of the disc plate 150 at two symmetrical positions. The locking claws 162 are locked at the outer circumference of the disc gear base 149 located below the disc plate 150 to integrate the disc plate 150 with the disc gear base 149. Angular gears 163 engaging with the outer circumferential gear 156 are formed at two positions rotated from the respective locking claws 162 by 90 degrees.

As shown in FIG. 18, the second rotating body 106 is shaped like a ring having a predetermined width, and an annular protrusion 106a and a driven gear 106b located below the annular protrusion 106a are formed on the outer circumferential surface. The guide rollers 146 mounted to the cylindrical body 104 attached to the cassette body 103 are rollably located on the annular protrusion 106a, and the second rotating body 106 is rotatably supported by the annular protrusion 106a. The driven gear 106b engages with a below-mentioned third driving gear 169 provided in the cassette attachment section 102 such that the second rotating body 106 can be rotated. The second rotating body 106 may be set to rotate at higher speed than the first rotating body 105. Thus, the interval between pieces of medicine, which are conveyed from the first rotating body 105 to the second rotating body 106, can be made wider, preventing wrong detection of the number of dispensed pieces of medicine.

Figure 25:
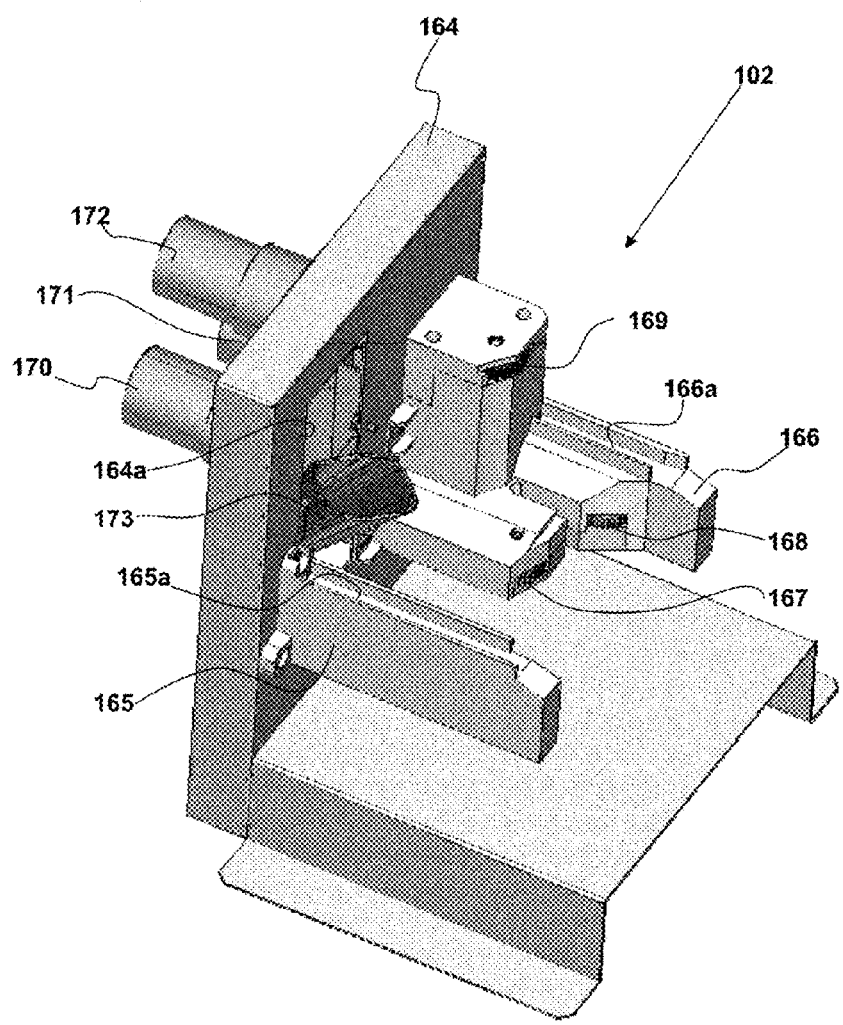
FIG. 25 is a perspective view showing a cassette attachment section in FIG. 15.

As in FIG. 1, the cassette attachment sections 102 are disposed in the shelf 2 of the medicine feeding apparatus in the longitudinal and lateral directions in a matrix manner. As shown in FIG. 25, the first guide rail 165 and the second guide rail 166 protrude forward from a back section 164 of the cassette attachment section 102, with a predetermined distance therebetween. A rectangular opening 164a is formed in the back section 164, and a discharge tube 173 communicating with the discharge section 135 is attached thereto.

The first guide rail 165 includes a groove 165a for guiding the lower end of the first side wall 111a formed on the body section 107 that constitutes part of the cassette body 103 of the medicine cassette 101.

The second guide rail 166 has a groove 166a for guiding the lower end of the second side wall 111b formed on the body section 107 that constitutes part of the cassette body 103, and openings for exposing the driving gears (the first driving gear 167, the second driving gear 168, and the third driving gear 169) at three positions. The first driving gear 167 engages with a gear coupled to the rotating shaft of the first motor 170 via an intermediate gear. The first driving gear 167 engages with the first driven gear 114 of the medicine cassette 101 attached to the cassette attachment section 102 to transmit a driving force of the first motor 170 to the first shaft member 121. A gear coaxially-mounted to the second driving gear 168 engages with a gear coupled to a rotating shaft of a second motor 171. The second driving gear 168 engages with the second driven gear 115 of the medicine cassette 101 attached to the cassette attachment section 102 to transmit a driving force of the second motor 171 to the second shaft member 122. The third driving gear 169 engages with a gear coupled to a rotating shaft of a third motor 172. The third driving gear 169 engages with the driven gear 106b formed in the second rotating body 106 of the medicine cassette 101 attached to the cassette attachment section 102 to transmit a driving force of the third motor 172 to the second rotating body 106.

The controller 4 receives prescription data from a server not shown and input signals from various sensors to control driving each of the motors.

Next, the operation of the medicine feeding apparatus thus configured will be described. However, control contents are the same as those in the first embodiment (flow chart in FIG. 14).

First, prescription data is received from a server not shown, etc. to identify the medicine cassette 101 that stores medicine included in the prescription data. In the identified medicine cassette 101, the second motor 171 is driven to start rotation of the first rotating body 105, and the third motor 172 is driven to start rotation of the second rotating body 106. Thereby, medicine stored in the medicine cassette 101 is moved by the rotation of the first rotating body 105 in the rotating direction and the outer-diameter direction. The cylindrical section 140 is inclined with respect to the vertical direction, and medicine stored in the medicine storage section 133 is closest to the second rotating body 106 at the closest position of the cylindrical section 140. For this reason, pieces of medicine moving in the outer-diameter direction are sequentially moved onto the second rotating body in the vicinity of the closest position of the cylindrical section 140.

The pieces of medicine moved onto the second rotating body 106 are conveyed by the rotation of the second rotating body 106, and the stacked pieces of medicine are first returned to the medicine storage section 133 by the height limiting member 132. Subsequently, since the exposed part of the second rotating body 106 is gradually narrowed by the guide member 131, remaining pieces of medicine on the second rotating body 106 can pass only one by one, and the pieces other than passed piece are smoothly returned to the medicine storage section 133 along the curved surface of the cylindrical section 140. The passed piece of medicine is guided by the guide member 131 and the discharge guide piece 138 and then, is discharged from the discharge section 135. At this time, a sensor not shown detects the discharged piece, and counts the number of dispensed pieces.

Although medicine in the medicine storage section 133 is sequentially dispensed in this manner, the first rotating body 105 is moved up depending on the medicine dispensing state. That is, a sensor not shown detects whether or not medicine is present on the second rotating body 106, and it is determined whether or not the medicine dispensing state deteriorates depending on that medicine cannot be detected, or a time interval at which medicine discharged from the discharge section 135 is detected by a sensor that counts the number of dispensed pieces exceeds a predetermined time. When the state deteriorates, the first motor 170 is driven, thereby rotating the first driven gear 114 via a plurality of gears not shown to rotate the first shaft member 121 of the shaft member unit 116 engaging with the first driven gear 114. The guide pin 155 is located in the helical groove 121a of the first shaft member 121. Thereby, with the rotation of the first shaft member 121, the first rotating body 105 to which the guide pin 155 is attached moves upward. As a result, medicine in the medicine storage section 133 can be smoothly moved onto the second rotating body 106 depending to the dispensing state.

When the number of pieces of medicine in the medicine storage section 133 decreases, the medicine cassette 101 may be detached from the cassette attachment section 102 to refill medicine. In this case, it is preferred that the first rotating body 105 is forcibly moved down to the lowest position by reversely driving the first motor 170 prior to detachment of the medicine cassette 101.

The present invention is not limited to the configuration described in the embodiment, and may be modified in various ways.

Figure 26:
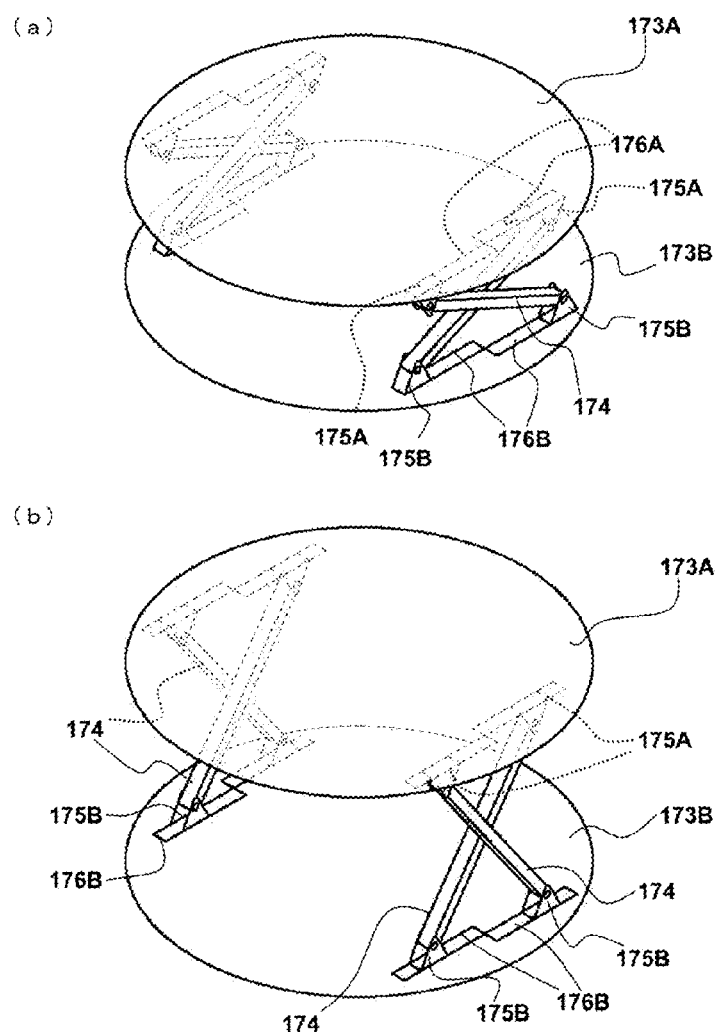
FIG. 26 is a schematic view showing a mechanism for raising and lowering a first rotating body in accordance with another embodiment.

For example, in the first embodiment, the first rotating body is moved up and down via the centrally provided first link 47 and second link 48 and however, the configuration shown in FIG. 26 may be adopted. That is, two pairs of links 174, with the links in each pair crossing each other, are provided between an upper plate 173A (side of the first rotating body 9) and a lower plate 173B (side of the cassette body 7), and are connected to the plates 173A and 173B rotatably and slidably. In the state shown in FIG. 26(a), bearing members 175A and 175B are located at one ends (ends on the outer diameter side of the plates 173A and 173B) of slide rails 176A and 176B, and the upper plate 173A is moved to the lowest position with respect to the lower plate 173B. As shown in FIG. 26(b), when the bearing member 175B is gradually moved to the other end of the slide rail 176B by a driving means not shown in the lower plate 173B, the bearing member 175A is gradually moved to the other end of the slide rail 176A also in the upper plate 173A. Thereby, the upper plate 173A gradually moves upward with respect to the lower plate 173B. With this configuration, the upper plate 173A is supported by the four links 174 in total, stabilizing the rising/lowering operation.

Figure 27:
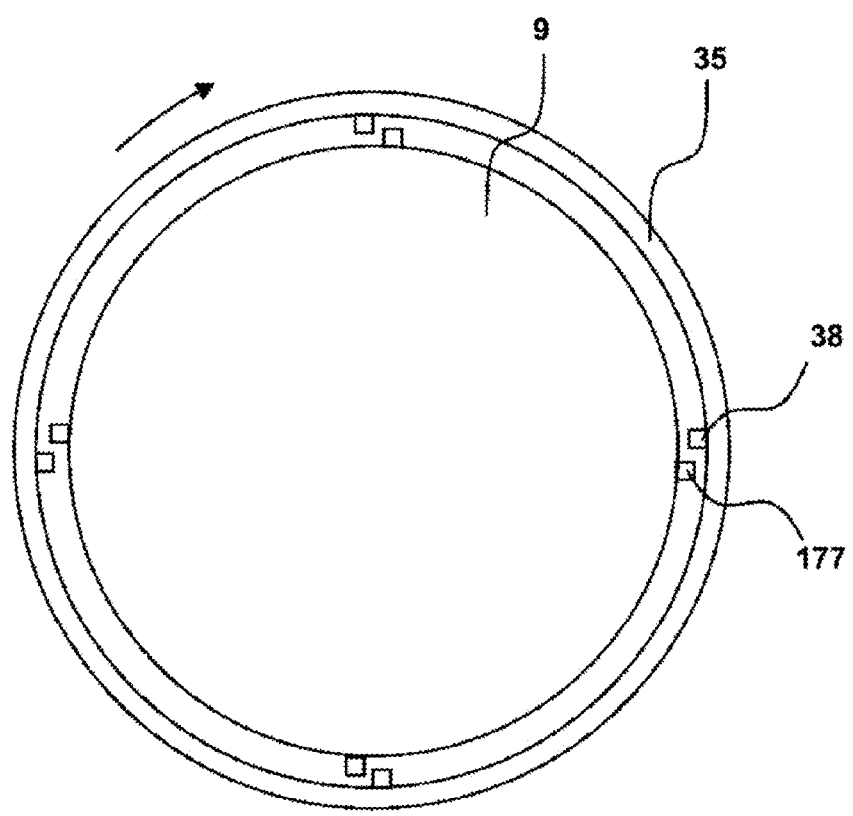
FIG. 27 is a schematic plan view showing a first rotating body and a first cylindrical body according to another embodiment.

In the first embodiment, the first rotating body 9 is provided with the guide rollers 43 (grooves in the outer circumference) as a guide receiving section and however, as shown in FIG. 27, the first rotating body 9 may be provided with a protrusion 177 as the guide receiving section. When the first cylindrical section 35 rotates in the direction of an arrow in FIG. 26, the protrusion 177 of the first rotating body 9 is pushed by a protrusion 38 of a first cylindrical body 35, and moves in the circumferential direction of the first cylindrical section 35. For this reason, when the first cylindrical section 35 rotates, the first rotating body 9 rotates.

DESCRIPTION OF SYMBOLS

1 Apparatus body
2 Shelf
3 Medicine feeder
4 Controller
5 Medicine cassette
6 Cassette attachment section
7 Cassette body
8 Cylindrical body
9 First rotating body
10 Second rotating body
11 Body section
12 Cover
13 Base
14 Handle
15 Bearing
16 Gear member
17 Side wall
18 Circumferential wall
19 First guide roller
20 Ring member
21 Tongue piece
22 Second guide roller
23 Cylindrical guide section
24 Guide wall
25 Guide member
26 Height limiting member
27 Adjusting screw
28 Discharge section
29 Notch
30 First side wall
31 Discharge guide piece
32 second side wall
33 Stepped recess
34 Front surface cover
35 First cylindrical section
36 Second cylindrical section
37 Annular flange
38 First projection (guide section)
39 Recess
40 Base plate
41 Cover plate
42 Medicine storage section
43 Guide roller (guide receiving section)
44 Shaft
45 Bearing
46 Support block
47 First link
48 Second link
49 Cylindrical cam member
50 Inclined section
51 Cap
52 Mounting section
53 Back section
54 First guide rail
55 Second guide rail
56 Rail
57 First storage section
58 Second storage section
59 First motor
60 Second motor
61 Discharge tube
62 Third motor
101 Medicine cassette
102 Cassette attachment section
103 Cassette body
104 Cylindrical body
105 First rotating body
106 Second rotating body
107 Body section
108 Cover
109 Bottomed cylindrical section
110 Flange
111 Side wall
112 Handle
113 Attachment table
114 First driven gear
115 Second driven gear
116 Shaft member unit
117 First attachment plate
118 Second attachment plate
119 Guide plate
120 Shaft guide
121 First shaft member
122 Second shaft member
123 First recess
124 Second recess
125 Circumferential wall
126 Depressed section
127 Notch
128 Circumferential wall
129 Cylindrical guide section
130 Guide wall
131 Guide member
132 Height limiting member
133 Medicine storage section
134 Reinforcing beam
135 Discharge section
136 Notch
137 First side wall
138 Discharge guide piece
139 Second side wall
140 Cylindrical section
141 Flange
142 Expanding section
143 First expanding area
144 Second expanding area
145 Flat section
146 Guide roller
147 Bearing member
148 Closing plate
149 Disc gear base
150 Disc plate
151 Bearing
152 Insertion hole
153 Tongue piece
154 Guide block
155 Guide pin
156 Outer circumferential gear
157 Inner circumferential gear
158 First annular wall 159 Second annular wall
160 Annular plate
161 Cylindrical cover
162 Locking claw
163 Gear
164 Back section
165 First guide rail
166 Second guide rail
167 First driving gear
168 Second driving gear
169 Third driving gear
170 First motor
171 Second motor
172 Third motor
173A Upper plate
173B Lower plate
174 Link
175A, 175B Bearing member
176A, 176B Slide rail
177 Protrusion

The invention claimed is:

1. A medicine cassette comprising:
a cylindrical body;
a first rotating body disposed on the inner side of the cylindrical body; the first rotating body together with the cylindrical body constituting a medicine storage section capable of storing medicine, the first rotating body being reciprocable in the axial direction of the cylindrical body and being rotatable about a first rotary axis;
a second rotating body disposed on the outer circumference of an opening of the cylindrical body, the second rotating body being rotatable about a second rotary axis;
a second shaft member capable of transmitting a rotational driving force to the first rotating body;
a first shaft member having a helical groove formed in the outer circumferential surface in the axial direction; and
a bearing member having a guide pin movably disposed in the helical groove, the bearing member supporting the first rotating body.

2. The medicine cassette according to claim 1, wherein the first rotating body is disposed such that its upper surface is inclined with respect to the axis of the cylindrical body.

3. The medicine cassette according to claim 1, further comprising a discharge section for discharging medicine moving to the outer circumference with rotation of the second rotating body.

4. The medicine cassette according to claim 1, wherein the cylindrical body can rotate in the circumferential direction, and includes a guide section on its inner circumferential surface, the first rotating body includes a guide receiving section for guiding the guide section, and the guide receiving section guides the guide section such that the first rotating body cannot rotate in the circumferential direction with respect to the cylindrical body and can reciprocate in the axial direction.

5. The medicine cassette according to claim 1, further comprising a link mechanism for allowing the first rotating body to reciprocate in the axial direction of the cylindrical body.

6. The medicine cassette according to claim 5, wherein the link mechanism includes a first link coupled to the first rotating body so as to be rotatable about a spindle, a second link rotatably coupled to the first link, and a cylindrical cam member having an inclined section rotated to change its contact position with the second link in the axial direction.

7. The medicine cassette according to claim 5, wherein the link mechanism is configured of two pairs of links, the links in each pair being spaced with a predetermined interval, and in each link pair, intermediate sections of the links are rotatably coupled to each other, and one ends of the links are slidably coupled to the first rotating body to be extendable.

8. The medicine cassette according to claim 1, wherein the first rotating body includes an inner circumferential gear, and the second shaft member has a vertical gear engaging with the inner circumferential gear in the outer circumferential surface.

9. The medicine cassette according to claim 1, wherein the first rotating body is movable in the cylindrical body, in one axial direction by own weight.

10. The medicine cassette according to claim 1, further comprising a width limiting section for limiting a width that can pass medicine conveyed on the second rotating body, wherein the cylindrical body has an expanding area gradually protruding downward to the inner diameter side from the inner circumference of the second rotating body in an area, the width of which is limited by the width limiting section.

11. A medicine cassette comprising:
a cylindrical body;
a first rotating body disposed on the inner side of the cylindrical body, the first rotating body together with the cylindrical body constituting a medicine storage section capable of storing medicine, the first rotating body being reciprocable in the axial direction of the cylindrical body and being rotatable about a first rotary axis;
a second rotating body disposed on the outer circumference of an opening of the cylindrical body, the second rotating body being rotatable about a second rotary axis;
a grasping section formed on a front surface;
a transmitting section for transmitting a rotational driving force to rotate the first rotating body to the first rotating body;
a transmitting section for transmitting an elevating driving force to elevate the first rotating body to the first rotating body; and
a transmitting section for transmitting a rotational driving force to rotate the second rotating body to the second rotating body, wherein
the three transmitting sections are exposed from a back surface.

12. A medicine feeding apparatus comprising:
a medicine cassette including a cylindrical body, a first rotating body disposed on the inner side of the cylindrical body, the first rotating body together with the cylindrical body constituting a medicine storage section capable of storing medicine, the first rotating body being reciprocable in the axial direction of the cylindrical body and being rotatable about a first rotary axis, and a second rotating body disposed on the outer circumference of an opening of the cylindrical body, the second rotating body being rotatable about a second rotary axis; and
a cassette attachment section to which the medicine cassette can be attached, wherein the cassette attachment section has a driving member for rotating the first rotating body, a driving member for raising or lowering the first rotating body, and a driving member for rotating the second rotating member, and positions where driving forces are transmitted by the driving members are located on the same surface of the cassette attachment section.

* * * * *